US011582387B2

(12) United States Patent
Newman

(10) Patent No.: US 11,582,387 B2
(45) Date of Patent: Feb. 14, 2023

(54) APPARATUS AND METHODS FOR PRE-PROCESSING AND STABILIZATION OF CAPTURED IMAGE DATA

(71) Applicant: GoPro, Inc., San Mateo, CA (US)

(72) Inventor: David Newman, San Diego, CA (US)

(73) Assignee: GoPro, Inc., San Mateo, CA (US)

( * ) Notice: Subject to any disclaimer, the term of this patent is extended or adjusted under 35 U.S.C. 154(b) by 0 days.

(21) Appl. No.: 17/241,056

(22) Filed: Apr. 26, 2021

(65) Prior Publication Data

US 2021/0250507 A1 Aug. 12, 2021

Related U.S. Application Data

(63) Continuation of application No. 16/503,320, filed on Jul. 3, 2019, now Pat. No. 11,050,938.

(51) Int. Cl.
*H04N 5/232* (2006.01)
*H04N 19/15* (2014.01)
*G06T 3/40* (2006.01)

(52) U.S. Cl.
CPC ....... *H04N 5/23277* (2013.01); *G06T 3/4038* (2013.01); *H04N 5/23258* (2013.01); *H04N 19/15* (2014.11)

(58) Field of Classification Search
CPC .................................................. H04N 5/23277
USPC ...................................................... 348/208.6
See application file for complete search history.

(56) References Cited

U.S. PATENT DOCUMENTS 10,078,644 B1 * 9/2018 Newman ............ H04N 5/23293
10,110,814 B1 * 10/2018 Day ..................... H04N 5/2258
10,404,915 B1 * 9/2019 Chen .................. H04N 5/23264
2008/0246848 A1 10/2008 Tsubaki
2013/0242057 A1 9/2013 Hong
(Continued)

FOREIGN PATENT DOCUMENTS

CN 106605407 A 4/2017
CN 107925722 A 4/2018
(Continued)

OTHER PUBLICATIONS

International Search Report and Written Opinion issued in PCT/US20/040740, dated Sep. 15, 2020, 10 pages.

*Primary Examiner* — Joel W Fosselman

(74) *Attorney, Agent, or Firm* — Wang Hardoon, P.C.

(57) ABSTRACT

Apparatus and methods for the pre-processing of image data so as to enhance quality of subsequent encoding and rendering. In one embodiment, a capture device is disclosed that includes a processing apparatus and a non-transitory computer readable apparatus comprising a storage medium have one or more instructions stored thereon. The one or more instructions, when executed by the processing apparatus, are configured to: receive captured image data (such as that sourced from two or more separate image sensors) and pre-process the data to enable stabilization of the corresponding images prior to encoding. In some implementations, the pre-processing includes combination (e.g., stitching) of the captured image data associated with the two or more sensors to facilitates the stabilization. Advantageously, undesirable artifacts such as object "jitter" can be reduced or eliminated. Methods and non-transitory computer readable apparatus are also disclosed.

20 Claims, 15 Drawing Sheets

(56) References Cited

U.S. PATENT DOCUMENTS

| | | |
|---|---|---|
| 2015/0254871 A1 | 9/2015 | MacMillan |
| 2016/0014426 A1* | 1/2016 | Richert .................. G06T 7/579 375/240.16 |
| 2017/0142337 A1 | 5/2017 | Kokaram |
| 2018/0260929 A1 | 9/2018 | Belogolovy |

FOREIGN PATENT DOCUMENTS

| | | |
|---|---|---|
| CN | 109076239 A | 12/2018 |
| WO | 2018124774 | 7/2018 |

* cited by examiner

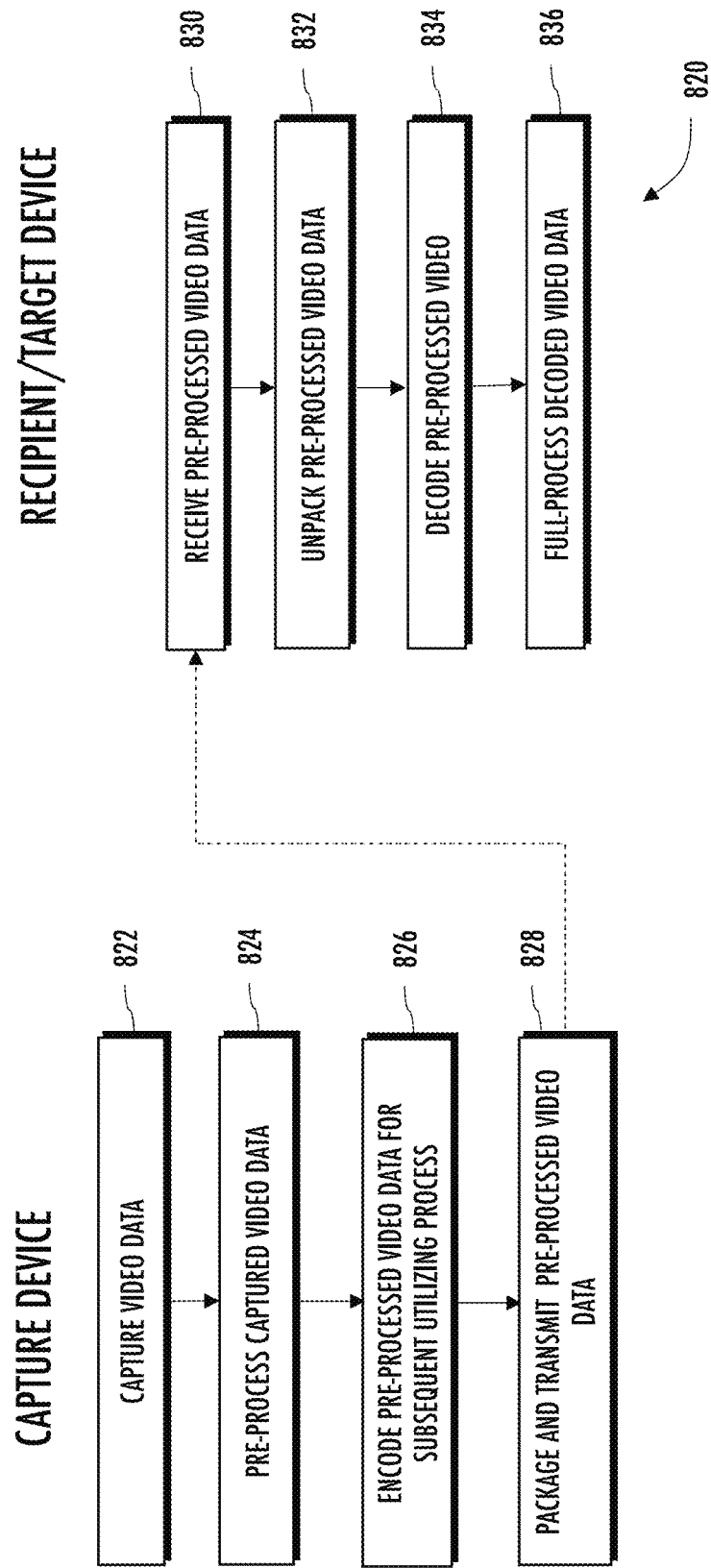

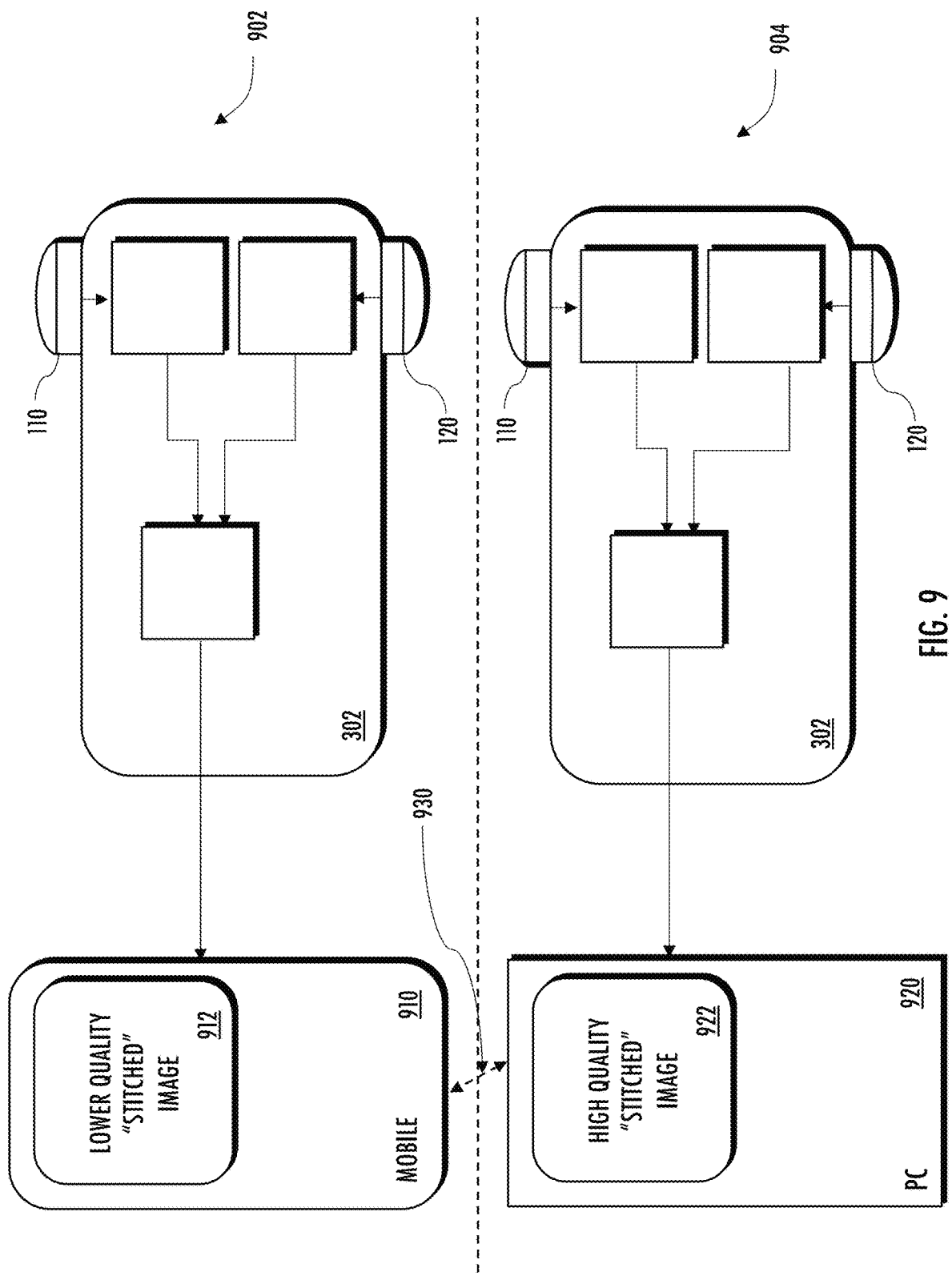

APPARATUS AND METHODS FOR PRE-PROCESSING AND STABILIZATION OF CAPTURED IMAGE DATA

RELATED APPLICATIONS

This application is generally related to the subject matter of co-owned U.S. patent application Ser. No. 16/235,866 entitled "APPARATUS AND METHODS FOR NON-UNIFORM DOWNSAMPLING OF CAPTURED PANORAMIC IMAGES" filed Dec. 28, 2018, which claims the benefit of priority to U.S. Provisional Patent Application Ser. No. 62/612,041 filed Dec. 29, 2017 and entitled "METHODS AND APPARATUS FOR RE-PROJECTION OF PANORAMIC CONTENT," each of the foregoing incorporated herein by reference in its entirety.

PRIORITY

This application claims the benefit of priority to co-owned U.S. patent application Ser. No. 16/503,320 entitled "APPARATUS AND METHODS FOR PRE-PROCESSING AND STABILIZATION OF CAPTURED IMAGE DATA" filed Jul. 3, 2019, the contents of which are incorporated herein by reference in its entirety. CL COPYRIGHT A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

TECHNICAL FIELD

The present disclosure relates generally to video image processing and in one exemplary aspect, to methods and apparatus for the processing of captured image data, including pre-processing and stabilization of image data.

DESCRIPTION OF RELATED TECHNOLOGY

Spherical images are typically obtained by capturing multiple images with overlapping fields of view from different cameras and combining ("stitching") data of these images together in order to provide a two-dimensional projection. Unfortunately, these captured panoramic images are not well-suited for use with traditional encoders/decoders. For example, the GoPro® Fusion camera system includes image sensors which natively capture at a 3100 pixel by 3000 pixel resolution. However, this native image needs to be processed into a format (e.g., MPEG) which is useful for subsequent consuming devices, such as the user's PC or mobile device.

Conventionally, in order to retain the maximum amount of image quality, the data processing "work flow" should seek to minimize the introduction of errors. Specifically, as shown in FIG. 1, the video data derived from the different capturing sensors 110 (e.g., spherical cameras) is stitched on a high-performance processor (e.g., high-end video production platform 150) after it has been encoded by the capture device 100. In some exemplary scenarios (such as that shown in FIG. 1), the following process 102 is utilized by the capture device 100: (i) capture "RAW" or unrefined data at the highest quality and obtain corresponding unrefined image data; and (ii) encode the unrefined image data to the target codec (e.g., MPEG) at the highest quality consistent with that codec (which may itself be lossy).

Once the encoded data has been transferred to the production platform 150, the following process 104 is used: (i) decode the encoded MPEG (again at its highest quality); and (ii) stitch the image data which has been decoded from MPEG for presentation.

As a brief aside, the "RAW" or unrefined data referenced above is not image data per se; it has all of the data necessary to ultimately create an image, but it is not an image file that is formatted for or capable of rendering via a codec (e.g., for display on a target device). One purpose of the RAW image data is to preserve the data obtained from the capturing sensor in its full detail. As an initial step to various image processing operations, the RAW or unrefined data from the sensor(s) is converted into an unrefined image data format.

In contrast to unrefined image data, target codec formats such as MPEG are formatted to be able to be rendered by a playing device such as a PC, laptop, or mobile device with the appropriate codec software. Accordingly, in many cases, a standard display range (e.g., 8 bit, 16 bit, etc.) and standard display size (e.g., 1080p, etc.) are utilized to enable consistency with ubiquitous commercial display and rendering technologies.

Returning again to FIG. 1, the encoding process 102 utilized by the capture device 100 involves a series of steps, including (i) motion estimation (which may include e.g., edge detection, velocity estimation, etc.), (ii) quantization/DCT (discrete cosine transformation), and (iii) residual encoding. Likewise, the "stitch" of the video 104 of FIG. 1 includes several constituent steps comprising: (i) edge detection, (ii) actual stitching or combination of the image data portions, and (iii) stabilization. Overall, such constituent steps are not only processor-intensive, but as described in greater detail below, inject undesirable artifacts or errors into the process when the encoded video data is ultimately decoded and processed 104 by the video processing platform 150.

Conversely, transfer of the captured unrefined image data to the target video production platform is highly non-optimized for, inter alia, mobile "action" capture devices, since: (i) storage of the comparatively voluminous (non-encoded) unrefined image data necessitates excessive on-board storage capability, and (ii) transmission of such unrefined image data greatly strains the bandwidth capabilities of all but the most robust data interfaces.

FIGS. 2A and 2B illustrate one undesirable artifact that may be introduced into the encoding/decoding/stitch process using the foregoing approach (shown with respect to decoded and processed images). In the exemplary case of the aforementioned mobile action camera, significant amounts of motion of the camera relative to its surroundings may exist (due to the nature of a typical use case, such as riding a mountain bike or surfing).

As an aside, motion-compensated video encoders such as MPEG are typically implemented in three stages: (i) motion estimation between the previously reconstructed frame and a current frame; (ii) current frame prediction using the motion estimates and the previously reconstructed frame; and (iii) differential encoding of the current frame prediction and the actual current frame (as prediction error). A receiver accordingly reconstructs the current image only using the encoded motion estimates and the prediction error.

Returning again to the first panel 202 of FIG. 2A, a series of subsequent image frames show a mountain peak 207 and a cloud 208. As the capture device (camera) moves relative to its surroundings, some of the captured image frames 210 display a relative movement or "jitter" relative to a stable frame of reference. While the mountain 207 and cloud do not themselves physically move (at least any perceptible amount) frame-to-frame, the motion of the camera makes them appear to move relative to the boundaries of the frame.

As shown in the second panel 204 of FIG. 2A, the apparent video frames (as viewed from the frame of reference of the camera and viewer operating the camera) appear stable, but the mountain/cloud move relative thereto from frame to frame.

Lastly, as shown in the third panel 206, the jitter- or motion-corrected video frames 212 (as corrected by the methodology of FIG. 1) show good stabilization of the mountain 207, but poor stabilization of the cloud 208. This result is due to several factors, as discussed now in greater detail with respect to FIG. 2B.

As shown in FIG. 2B, the mountain peak 207 has comparatively high contrast, and several discrete edges (and hence is "easy" to see jitter associated therewith from a processing perspective). Specifically, the applicable video coder encodes the mountain peak once (in an I-frame), and can use relative motion to describe its jitter (in P and B frames).

In contrast, the cloud 208 (note that the cloud is outlined to better show its motion in this Figure) has comparatively low contrast, and few if any discrete edges. Since the clouds are low contrast relative to their background, and have low edge content, the aforementioned video coder determines that the low information content of the cloud does not warrant its own relative motion vectors. The encoder assigns them the same relative motion vector as the mountain peak. The decoder decodes and renders the cloud once, and then uses the relative motion residual to update subsequent frames. Hence, from a processing perspective, there is no apparent jitter associated with the cloud 208, but in reality the encoder "mis-corrects" the cloud 208, and as a result it appears to "dance" or shake when viewed on playback of the encoded (and stitched) file. The cloud is rendered correctly as to shape and size, but its motion is recognizably wrong and non-physical.

Part of the reason behind the foregoing undesirable result is that extant ostensibly "high quality" encoding such as via the process shown in FIG. 1, is focused on perceptible visual effects for humans, not machines. Computer algorithms tend to focus on sharp lines and smooth motion across each frame, and hence poorly resolved subject matter such as the cloud 208 are not handled optimally under the approach shown in FIG. 1. This is exacerbated by (or even rooted in) the placement of the (only) stabilization process at the end of the processing work flow of FIG. 1, thereby forcing the encoding process to attempt to perform "challenging" motion estimation/compensation such as that for the low-contrast cloud 208.

Accordingly, what is needed are improved methods and apparatus for processing captured video data (including that which is associated with multiple sensors, and hence requires matching or "stitching") which overcomes the foregoing disabilities. Ideally, such improved method and apparatus should be readily compatible with current data formats (including e.g., unrefined image data formats) and capture device processing and storage capabilities, and enable ready transfer off of the capture device by conventional (e.g., wireless) interfaces, yet still preserve the high image quality desired by users (including accurate and high-quality stitching, as well as elimination or reduction of undesirable video artifact and corresponding reduction of encoded bitrate).

SUMMARY

The present disclosure satisfies the foregoing needs by providing, inter alia, methods and apparatus for the effective and efficient processing of captured image data.

In one aspect, the foregoing methods and apparatus for processing include (i) pre-processing of a first data format obtained from two or more sensors to perform a rough or first-level "stitch" (aka "pre-stitch") of the data; (ii) stabilization of the pre-stitched data, and (iii) encoding of the stabilized pre-stitched data into a second format for transfer to a video platform. In one variant, the first data format is unrefined image data, and the second format is a target codec format such as an MPEG-based format.

In another aspect, a data capture device is disclosed. In one embodiment, the capture device includes a processing apparatus; two or more sensors configured to capture image data in data communication with the processing apparatus; and a non-transitory computer readable apparatus having a storage medium that includes one or more instructions stored thereon, the one or more instructions, when executed by the processing apparatus, being configured to: receive captured image data from the two or more sensors; pre-process the captured image data; and encode the pre-processed image data.

In one variant, the captured image data is generated by fisheye lens sensors, and the pre-processing comprises: (i) a preliminary stitch operation of the two or more sets of image data; and (ii) a stabilization operation.

In another variant, the captured image data is rendered in an unrefined image data format, and after the pre-processing is completed, the pre-processed unrefined image data is encoded into a target codec format. In one implementation, the target codec includes an MPEG-based codec format.

In yet another variant, the one or more instructions, when executed by the processing apparatus, are further configured to transmit the encoded image data via a network interface of the capture device. In one implementation, the transmitted encoded image data retains a prescribed percentage of a full resolution of the source unrefined image data.

In another aspect, a computing device is disclosed. In one embodiment, the computing device includes a processing apparatus; a network interface; and a non-transitory computer readable apparatus having a storage medium that includes one or more instructions stored thereon, the one or more instructions, when executed by the processing apparatus, being configured to: receive encoded (pre-processed) captured image data from a capture device via the network interface; decode the encoded captured image data; and perform post-processing of the decoded image data according to one or more presentation rules.

In one variant, the post-processing comprises a high-quality or "full" stitch operation of the decoded, pre-processed (e.g., pre-stitched and stabilized) image data, and the computing device comprises a high-performance video development platform such as a PC.

In one variant, the post-processing comprises a medium-quality stitch operation of the decoded, pre-processed (e.g., pre-stitched and stabilized) image data, and the computing device comprises a mobile device such as a smartphone.

In another aspect, a method of encoding captured images is disclosed. In one embodiment, the method includes receiving first and second captured image data in a first format on a first platform, the first and second captured image data obtained using respective first and second image sensors; algorithmically performing a preliminary matching operation between at least portions of the first and second image data; and algorithmically stabilizing at least the matched first and second image data to produce stabilized first and second image data.

In one variant, the method further includes encoding the stabilized image utilizing a lossy image data compression algorithm. In one implementation, the method further includes transferring the encoded stabilized image data to a second platform, and (i) decoding the encoded stabilized image data; and (ii) performing post-processing of the decoded stabilized image data according to one or more prescribed operations.

In another aspect, a system is disclosed. In one embodiment, the system includes (i) one or more capture devices, and (ii) on or more processing platforms. In one variant, the one or more capture devices are multi-sensor (e.g., multi CMOS or CCD-based imaging sensors) action camera devices, and the one or more processing platforms comprise personal computer(s). In another variant, the processing platform(s) is/are one or more wireless-enabled smartphone(s). In yet another embodiment, the one or more processing platforms comprise one or more cloud-based computing assets (e.g., servers or server farms).

In yet a further aspect, a video processing-enabled mobile device is disclosed. In one embodiment, the mobile device includes processing apparatus, a wireless network interface, and a storage device in data communication with the processing apparatus, the storage device comprising at least one computer program configured to, when executed: (i) receive, via the wireless network interface, pre-processed and encoded video data from a capture device; (ii) decode the encoded received data; and (iii) post-process the decoded data based on one or more display or presentation considerations. In one variant, the post-processing includes utilization of one or more stitching or smoothing algorithms to refine the quality of a composite image generated from two or more constituent images making up the pre-processed data that was transmitted from the capture device.

In another aspect, an integrated circuit (IC) device implementing one or more of the foregoing aspects is disclosed and described. In one embodiment, the IC device is embodied as a SoC (system on Chip) device. In another embodiment, an ASIC (application specific IC) is used as the basis of the device. In yet another embodiment, a chip set (i.e., multiple ICs used in coordinated fashion) is disclosed. In yet another embodiment, the device comprises a multi-logic block FPGA device.

In another aspect, a non-transitory computer readable storage apparatus implementing one or more of the foregoing aspects is disclosed and described. In one embodiment, the computer readable apparatus comprises a program memory, or an EEPROM. In another embodiment, the apparatus includes a solid state drive (SSD) or other mass storage device. In another embodiment, the apparatus comprises a USB or other "flash drive" or other such portable removable storage device.

In another aspect, a method of encoding captured video data so as to eliminate motion-related jitter of one or more portions of the captured video data is disclosed. In one exemplary embodiment, the method includes: receiving first captured video data captured by a first sensor, the first captured video data rendered in a first format and having a first field of view (FOV); receiving second captured video data captured by a second sensor, the second captured video data rendered in the first format and having a second FOV which at least partly overlaps with the first FOV; combining the first captured video data and the second captured video data while each are in the first format so as to produce first combined video data; performing a stabilization process on the first combined video data so as to produce stabilized combined video data; encoding the stabilized combined video data to produce encoded stabilized combined video data; and storing the encoded stabilized combined video data into at least one data structure associated with a second format utilized by a target encoder process. In one variant, the combining, performing and encoding cooperate to enable subsequent manipulation of the data structure by a computerized process to further enhance at least one attribute of the encoded stabilized combined video data.

In another aspect of the present disclosure, a method of encoding captured image data is disclosed. In one embodiment, the method reduces at least a file size, and includes: receiving captured image data captured by at least one sensor, the captured image data associated with a first format; pre-processing the captured image data associated with the first format; encoding the pre-processed captured image data into at least one of a data file or plurality of streaming packets associated with a second format; and causing at least one of (i) storing of the data file or plurality of streaming packets, or (ii) transmitting of the data file or plurality of streaming packets over a data interface.

In another aspect of the present disclosure, a computerized device is disclosed. In one embodiment, the computerized device includes a non-transitory computer readable apparatus in data communication with a digital processing apparatus and comprising a storage medium, the storage medium having one or more instructions stored there, the one or more instructions being configured to, when executed by the digital processing apparatus, cause the computerized device to: receive captured image data; process the captured image data so as to provide stabilization of at least a portion thereof; and encode the processed image data.

Other features and advantages of the present disclosure will immediately be recognized by persons of ordinary skill in the art with reference to the attached drawings and detailed description of exemplary implementations as given below.

BRIEF DESCRIPTION OF THE DRAWINGS

FIG. 8A is a logical flow diagram of one exemplary implementation of the generalized method for processing captured video data of FIG. 8.

FIG. 9 is a block diagram illustrating different use cases or operational scenarios which may utilize the methods and apparatus of the present disclosure.

DETAILED DESCRIPTION

Implementations of the present technology will now be described in detail with reference to the drawings, which are provided as illustrative examples and species of broader genuses so as to enable those skilled in the art to practice the APPARATUS AND METHODS FOR PRE-PROCESSING AND STABILIZATION OF CAPTURED IMAGE DATA technology. Notably, the figures and examples below are not meant to limit the scope of the present disclosure to any single implementation or implementations, but other implementations are possible by way of interchange of, substitution of, or combination with some or all of the described or illustrated elements. Wherever convenient, the same reference numbers will be used throughout the drawings to refer to same or like parts.

Moreover, while implementations described herein are primarily discussed in the context of spherical images that are captured using a spherical camera system having two (2) cameras (e.g., a front-facing and a rear-facing camera), it is readily appreciated that the principles described herein can be equally applied to other camera configurations that include more, or less cameras. For example, when obtaining panoramic (e.g., 360°) content, three or more images from three or more cameras may be "combined" (matched or stitched). Additionally, the principles of the present disclosure may be applied to camera systems that include only one (1) camera in certain circumstances (e.g., camera systems with higher resolution image sensors and/or wider field of view (FOV) lenses).

Additionally, while primarily discussed in the context of camera configurations in which each of the centers of view for the respective cameras reside on a given two-dimensional plane, it is readily appreciated that one or more of these cameras can reside such that their center of view is focused at an azimuthal angle (e.g., at 45°), with respect to the given two-dimensional plane for other one(s) of the cameras.

Those of ordinary skill in the related arts will also readily appreciate that symmetric and asymmetric camera configurations can be substituted with equivalent success. For example, a symmetric dual camera system (a Janus configuration) may have fisheye lenses that provide a FOV that is greater than 180°. In asymmetric implementations, the cameras may have different FOV angles; e.g., a higher resolution 195° front-facing camera, and a lower resolution 245° rear-facing camera. Such implementations may be useful to store front and back images according to a common format size, while still providing higher resolution for objects within the field of interest (e.g., the front camera's perspective).

These and other variations would be readily apparent to one of ordinary skill given the contents of the present disclosure.

Exemplary Image Data Processing Architecture

Figure 1:
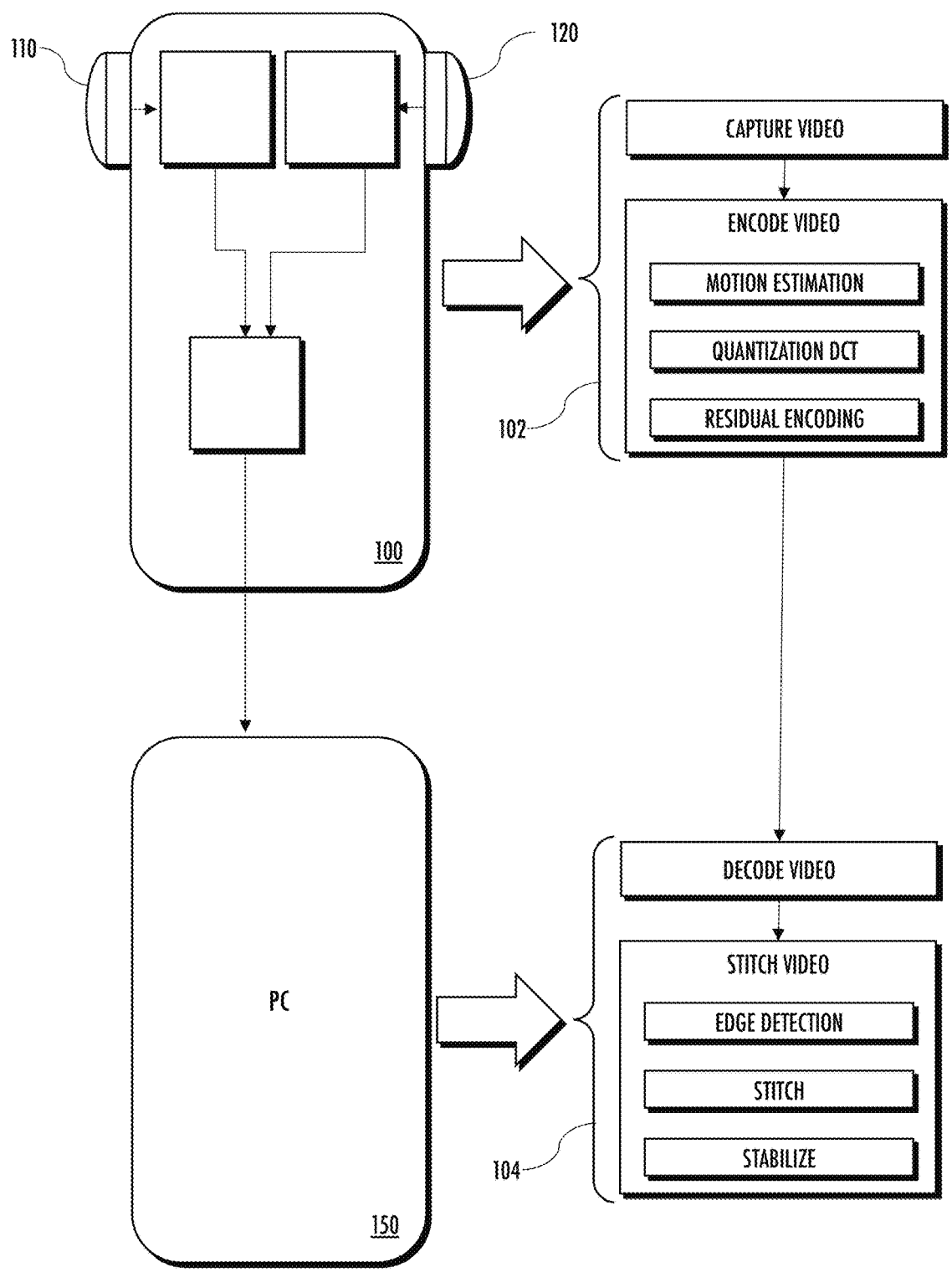
FIG. 1 is a block diagram illustrating one prior approach to processing captured video data.
Figure 2A:
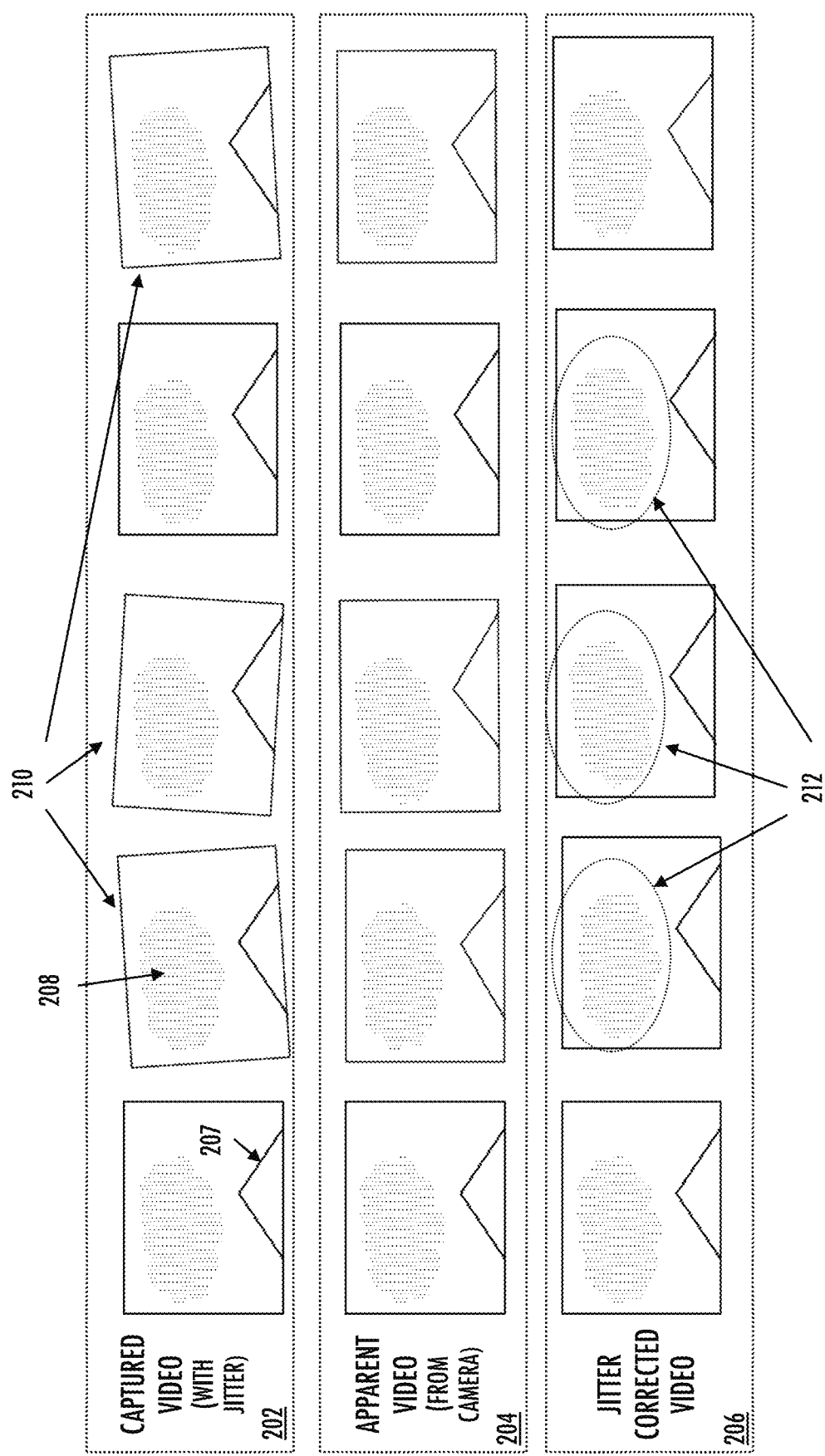
FIGS. 2A and 2B are graphical representations of disabilities associated with some approaches to jitter correction of video data.
Figure 2B:
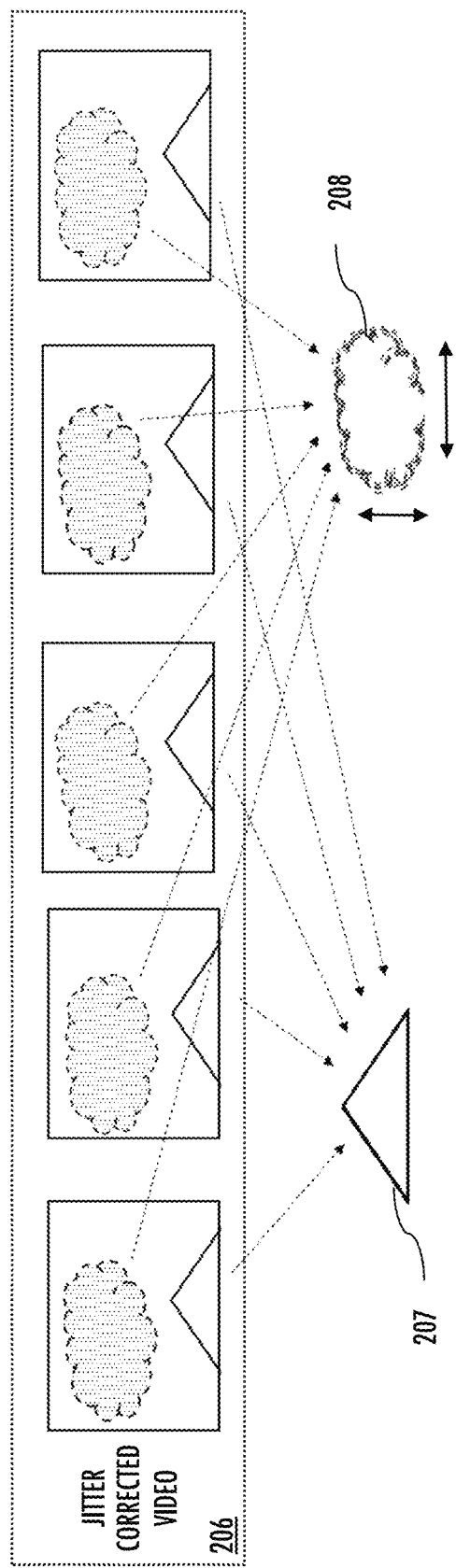
Figure 3:
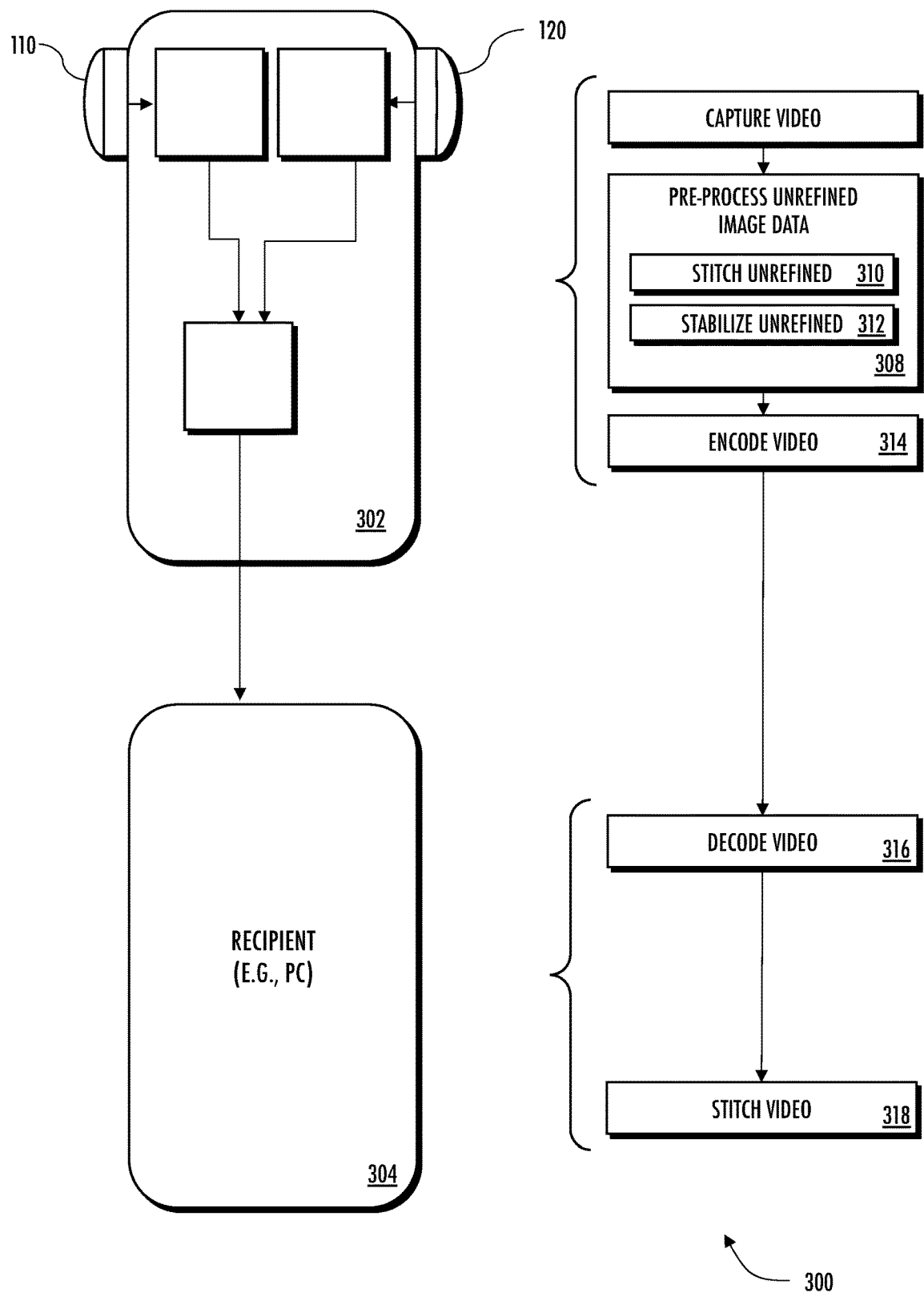
FIG. 3 is a block diagram illustrating one approach to captured video data processing according to the present disclosure.
Figure 3A:
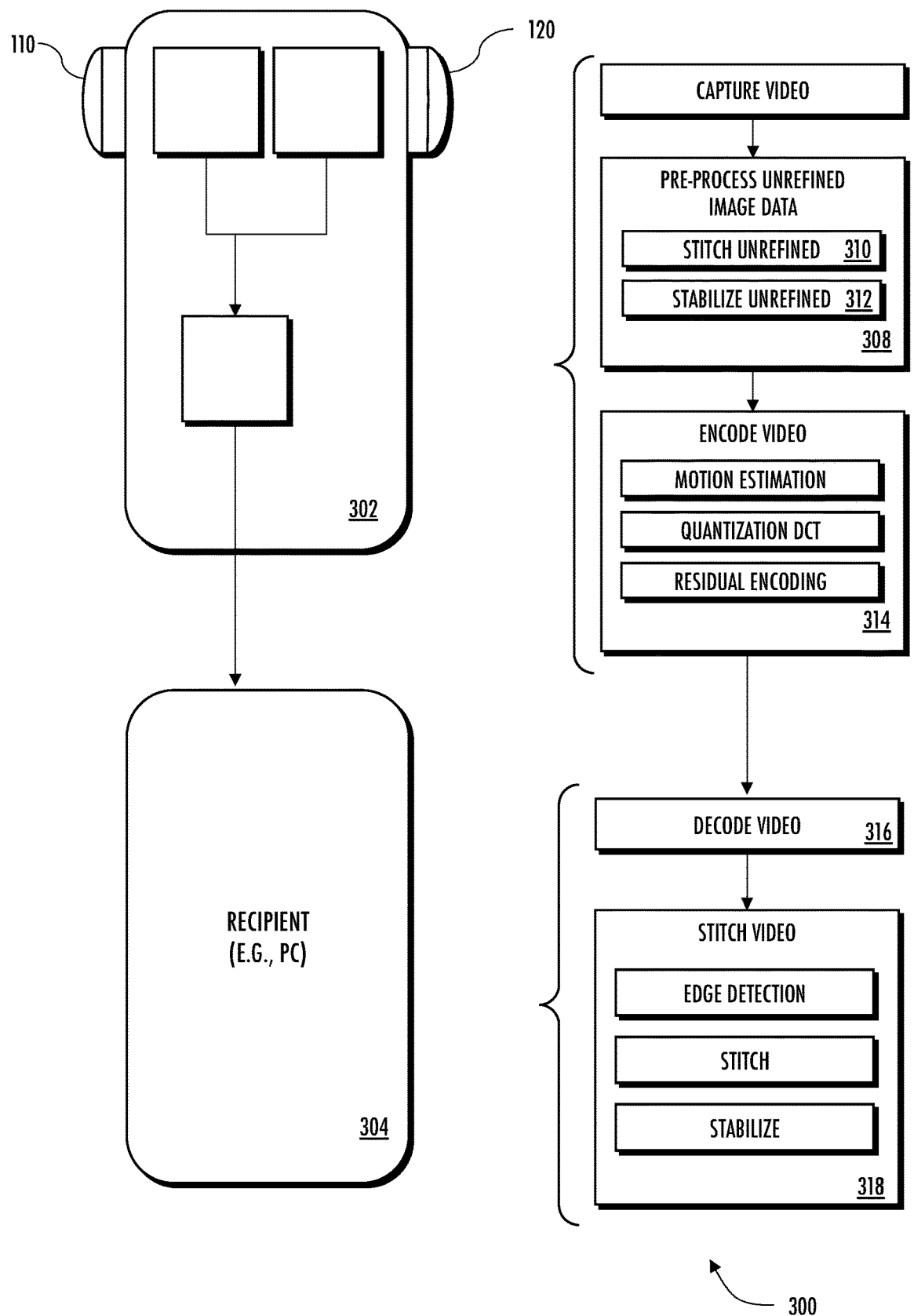
FIG. 3A is a block diagram illustrating the approach to captured video data processing of FIG. 3 according to one implementation thereof.

Referring now to FIGS. 3 and 3A, one exemplary embodiment of an image data processing architecture is shown and described in detail. Advantageously, this architecture overcomes the salient disabilities with the conventional approaches described with respect to FIGS. 1-2B herein, including specifically the introduction of jitter or inaccurate motion artifact during the data encoding and related processes.

As shown in FIGS. 3 and 3A, the architecture 300 generally includes a first processing apparatus or platform (here, a capture device 302, but could be another form factor or type of device such as an intermediary between the image sensor device(s) and downstream devices), and a recipient or target device 304 (e.g., a PC, or in some cases a mobile device such as a smartphone). In this embodiment, the first processing apparatus 302 obtains the generated unrefined image data from the sensor(s) 110, 120 (and their ISPs) and pre-processes the unrefined image data via pre-processing logic 308. Specifically, in one implementation, the pre-processing includes a simple combining (e.g., "stitching") 310 of the image data sourced from the individual sensors (and their ISPs), and stabilization 312 of the combined unrefined image data for e.g., motion-related artifact resulting from movement or jitter of the first platform 302. Exemplary combination and stabilization algorithms useful within this architecture are described in greater detail subsequently herein.

Notably, for images that will ultimately be stitched, failure to perform at least some combination or stitch of the images derived from e.g., the two fisheye sensors of the camera apparatus 302, will often result in undesired artifacts during the "final" stitch conducted by the target/recipient platform 304. However, a full or high-quality stitch of the type described subsequently herein is not needed (or desired) in this embodiment of the architecture. Rather, only the minimal level of combination of the images necessary to ensure accurate stabilization is needed.

After the pre-processing (combination and stabilization) logic operations have been completed (or at least have progressed sufficiently that encoding may begin in parallel), the pre-processed unrefined image data is then encoded into the target codec format (e.g., a variant of MPEG) per the encoder logic 314. Such encoding, while typically lossy in nature, advantageously (i) greatly reduces the transmission bandwidth and storage requirements associated with the image data over the unrefined format, yet (ii) preserves the high quality of the original image data for subsequent manipulation (post-processing) by the recipient or target platform 304. As previously described, such encoding 314 may include motion estimation, quantization/DCT, and residual encoding as well as other processes therein. Notably, however, with the stabilization of the combined or "pre-stitched" unrefined image data before encoding is applied, the aforementioned undesired artifact(s) is/are eliminated. As an illustration, in the exemplary context of the mountain peak and cloud of FIGS. 2A and 2B, the stabilization reduces or eliminates the opportunity for the subsequent encoding process to "mis-correct" for the cloud 208.

Next, as shown in FIGS. 3 and 3A, the encoded data (which may also be further processed according to one or more container, transport, or other protocols for transmission, such as framing or packetization of the data according to the underlying PHY and higher layer protocols) is transmitted via e.g., wireless or wireline data interface to the recipient device 304. Notably, by both eliminating the unwanted artifact and encoding the pre-processed data from unrefined image format to target codec format, the requisite transmission bandwidth (bitrate) is greatly reduced, and hence a less capable interface/air interface can be used between the capture device 302 and the recipient 304.

Also, subsequent to the pre-processing, the encoded data may also be "tagged" via e.g., metadata or other data ancillary to the image data itself so as to include desired information such as the identity/configuration of the capture device (or its particular sensors), date/time, geographic coordinates, user-specified fields, coding formats, or other.

Upon receipt by the receiving device 304, the encoded image data is unpacked as necessary (e.g., stripped of its framing/headers, etc.) and decoded via decoding logic 316 operative to run on the recipient platform 304. As will be appreciated, the recipient may include for instance a decoder or player algorithm for the target codec used (e.g., an MPEG decoder). Once decoded, the recovered pre-processed and stabilized data is then manipulated via post-processing 318 (which may include for instance stitching or other enhancement or processing techniques, including another stabilization process performed on image data that has been decoded on the target codec (such as MPEG) versus the stabilization performed on the unrefined image data by the capture device 302). The stitching or combination logic 318 may, depending on the type used, include algorithms for, e.g.: (i) edge detection, and (ii) combination or stitching of portions of images (such as matching edges to fit seams), as well as other functions, as described in greater detail below. Moreover, the combination process (or portions thereof) may be predicated or based at least in part on one or more display or presentation considerations or rules, such as those relating to a desired end-user display format, and image resolution/density.

Notably, the combination routines 318 utilized on the recipient/target platform 304 are, in one embodiment, greatly enhanced over those utilized on the capture device (i.e., for the "pre-stitch" 310 of the unrefined image data) so as to both utilize the greater onboard processing capabilities of the recipient platform, and enhance final combined image quality and user experience.

It will again be noted that while the foregoing exemplary embodiment of the architecture 300 is described in terms of a multi-sensor capture device (e.g., two spherical lens devices), the architecture and methods described herein may be adapted to single lens paradigms as well. For instance, even though combination or stitching of two images may be obviated in the single lens paradigm, benefits from the use of stabilization processes before the encoding is performed can result in downstream benefits including, inter alia, reduced encoded file size, transmission bandwidth requirements, and post-processing required by the recipient/target platform.

Figure 4:
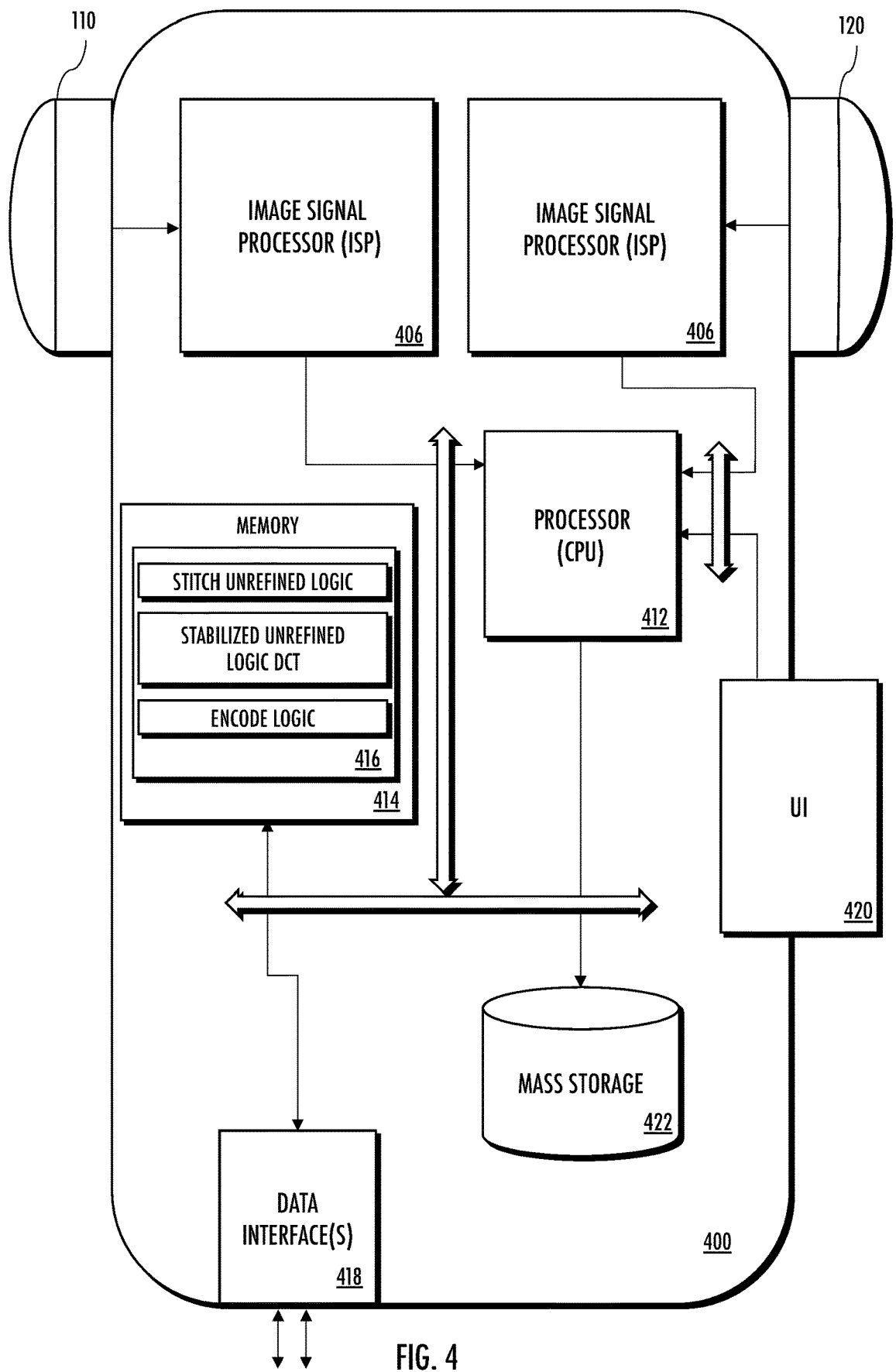
FIG. 4 is a block diagram of an exemplary implementation of a capture (e.g., action camera) device, useful in performing the methodologies described herein.
Figure 4A:
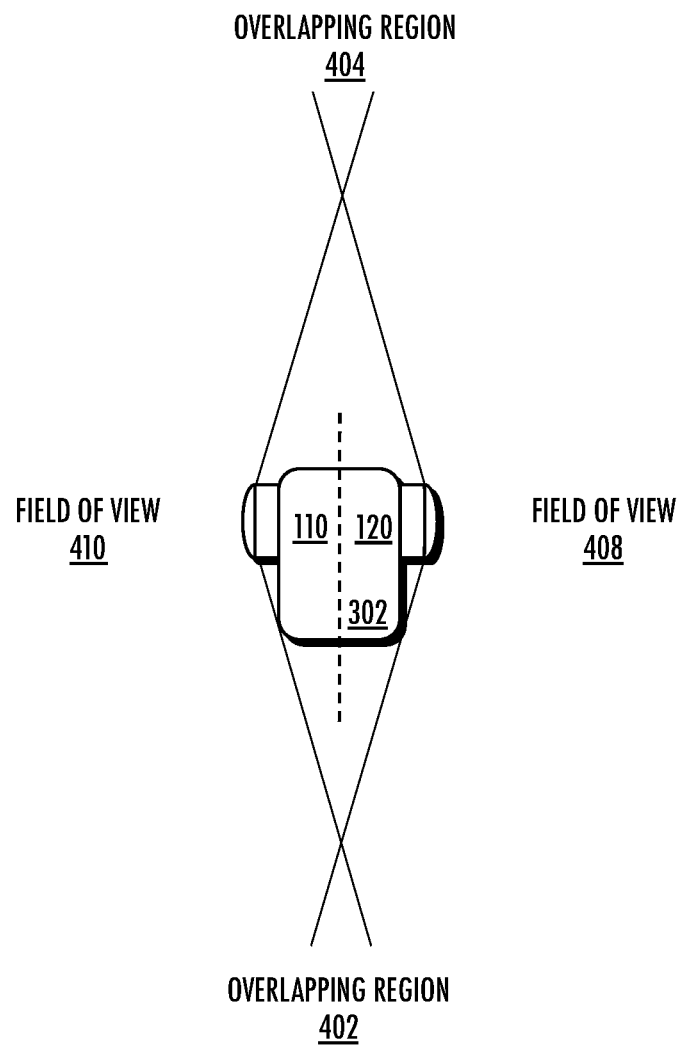
FIG. 4A is a block diagram of one exemplary implementation of the capture device of FIG. 4, illustrating the relationship of the fields of view (FOV) of the two spherical or "fisheye" sensors.

Still other camera systems may incorporate stereo vision (e.g., two or more lenses providing a stereo view as opposed to a "back to back" view as in FIG. 4A) for use in for example, 3D video and photography. In another example, a panning video capture can be divided into individual frames, and then stitched together. Video capture embodiments may use many frames (at many different perspectives) to perform stitching. Additionally, while the following description is presented within the context of visible light, other forms of image capture may be used with equivalent success. Common examples include without limitation, infrared, sonic, radar, lidar, and/or any other form of capture. In some cases, different capture technologies can provide a diversity of information more easily than visual imagery. For example, a sonar/visible light hybrid system can provide depth information and visible light information.

Exemplary Combining Approaches—

It will be appreciated that as used in the foregoing discussion of FIGS. 3 and 3A, the terms "combining," "combination" or similar refer to a process where at least a portion of image data associated with one source (e.g., sensor) or region is logically related to data from another source, sensor or region. Such logical relations may include processes such as "stitching" (e.g., where data from one image or region is combined with data from another, such that some data loss occurs, as in pixel replacement operations—discussed in greater detail below) and "matching" (e.g., where first data is positioned relative to second data so as to relate objects or features in one image relative to the other, but does not necessarily result in image data loss). Exemplary variants of combination processing techniques useful with the architecture of FIGS. 3 and 3A are now described in greater detail.

It will be appreciated that depending on the type of processing applied (e.g., stitching), various results may be obtained. For instance, if a full parallax compensation stitch operation (or even a simple blend operation) is applied, recoverability of the lost information is irreversible. The extra pixels rotated from the other image capture may be stored, without blend or any stitch being applied. This approach can achieve wider (or even infinite) jitter, without requiring more pixels. However, a seam between the front and back images may be produced that is encoded, but this does not greatly impact bitrate or quality (i.e., the savings made with the stable image is greater than the losses due to the seam). As one example, dual 200° lenses with a large jitter (e.g., of 90°) would produce movement of the image front lens image circle from −10° to 190°, to only having 80-190° on the front lens, with 170°-260° associated with the back lens. The overlap can be preserved for later stitching.

At a very simple level, one species of combination of two or more images may include merely aligning portions of the constituent unrefined data images such as based on one or more edges. For instance, where portions of a common object are present within a first image and a second image (i.e., straddles the boundary), merely (algorithmically) butting the edges of the images together so that the common object aligns may be used (assuming similar enough rendering of the object at each of the edges).

Another species of combining—"stitching"—refers to the process of combining multiple images with overlapping fields of view to produce an aggregated or composite image with a substantially larger FOV, higher quality, improved resolution, and/or other desired attributes. There are a number of image stitching techniques that can be used for unrefined image data, including feather and blend, and depth based image warping, etc.

In contrast to unrefined image data, target codec formats such as MPEG are formatted to be able to be rendered by a playing device such as a PC, laptop, or mobile device with the appropriate codec software. Accordingly, in many cases, a standard display range (e.g., 8 bit, 16 bit, etc.) and standard display size (e.g., 1080p, etc.) are utilized to enable consistency with ubiquitous commercial display and rendering technologies. As such, in contrast to unrefined image data, MPEG or other target codec data does not natively contain capture device-specific information (other than that which might be inserted in vendor proprietary fields—e.g., lens polynomial data).

Accordingly, techniques used for stitching unrefined image data (as within the pre-processing logic of the capture device 302 of FIGS. 3 and 3A) will utilize different approaches than those utilized in the recipient/target platform 304 stitch logic 318, the latter of which operate on image data decoded from MPEG or other target codecs versus the unrefined image data generated by the camera apparatus sensors and ISP logic.

Various other techniques for "combining" images via the capture device unrefined image data stitch process may be used consistent with the present disclosure (depending on the platform performing the operation(s)), the foregoing being purely illustrative.

"High Quality" or Full Combination Approaches

In the exemplary embodiments, the recipient/target platform 304 utilizes, as part of its "full" processing logic, combination logic directed to use of data decoded from the target codec (e.g., MPEG) versus the unrefined image data combination used in the capture device 302. Most approaches to image data combination give more seamless results when the overlapping regions between source images have similar capture conditions (e.g., lighting, perspective, color balance, focus). However, some combination techniques (which may be used for instance on the target/recipient platform 304 as part of its stitch logic 318 after the received MPEG data has been decoded) may be able to leverage advanced image processing techniques in regions of overlap to compensate or even benefit from such differences; for example, image information that is captured under a low light exposure can be combined with image information at a higher light exposure to emulate a larger dynamic range of exposure than would otherwise be possible with the camera sensor (also commonly referred to as High Dynamic Range (HDR) photography). Typically, an overlap region of 10%-20% of the total FOV can be used to reconcile and blend away differences between the source images to create an aesthetically "seamless" image.

Hence, the various embodiments described herein contemplate both utilization of "complex" combination or stitching techniques (such as where the recipient/target platform is a highly capable video development platform such as a PC with sophisticated image editing software), as well as more simplistic combination approaches (such as where the recipient platform 304 is a less capable mobile device). See the discussion of FIG. 9 presented infra for additional detail.

Generally, complex combination stitching techniques include one or more steps of: (i) determining which pixel coordinates of a first source image correspond to pixel coordinates of another image (alignment), (ii) reconciling differences in redundant pixel values between the two source images, (iii) applying blending filters, and (iv) warping the resulting stitched image to a projection. Various other techniques may be used, and the descriptions being purely illustrative.

One such example of a complex stitching technique is so-called depth-based stitching which uses object/feature detection and/or stereovision, to identify objects of varying distance or "depth" from the camera system. Based on the inferred depth of the source images and the relative distance and field of views of the corresponding camera system, the effects of parallax can be reduced or removed entirely. Existing solutions for removing parallax may be widely found through relevant literature; for example, the study of isomorphism within projective space (e.g., two equivalent objects) that are induced by an isomorphism of a vector space (e.g., two equivalent lines of sight) is broadly described as "homography".

When stitching or matching source images from the multiple (e.g., two (2)) fields of view together, the stitching or matching algorithms ultimately (i.e., before final rendering) should reconcile at least any salient differences between the two (2) source images. For example, objects present within overlapping regions (see FIG. 4A) will appear slightly different between the two (2) source images due to parallax effects. As used herein, the term "parallax" refers without limitation to a displacement or difference in the apparent position of an object viewed along different lines of sight. Parallax can be mathematically expressed or described with the angle or semi-angle of inclination between the lines of sight. As used herein, the term "perspective" refers to a warping or difference in the apparent dimensions of an object viewed along a line of sight.

As used herein, the term "redundant" within the context of source images, refers without limitation to pixel information that is found in multiple source images. Redundant information may be introduced by parallax effects and can be reconciled together to generate stitched output information. In contrast, as used herein, the term "singular" within the context of source images, refers without limitation to pixel information that is only found in a single source image. Singular information may be caused by blind spots or other occlusions and cannot be reconciled between images without introducing undesirable artifacts (e.g., translucency, warping, or other undesirable visual effects).

Redundantly captured information can be used in the combining (e.g., stitching) process to improve stitching. For example, sophisticated stitching techniques may attempt to use parallax information to discern distances and/or evaluate depth of the field of view. Still other techniques may intelligently weight or select (to the exclusion of others) singular pixel information from each field of view. However, simple stitching techniques (such as those described elsewhere herein with respect to the exemplary "pre-processing" performed by the capture device 302) may not differentiate between redundant and singular information; e.g., simple stitching may use a relatively simple cut-and-feather scheme, averaging scheme, or other unilaterally applied filtering technique.

Moreover, as will be further recognized, there are many ways to adjust an image to correct for e.g., parallax and/or blind spots. Adjustments performed by the recipient/target platform 304 may include, without limitation: warping, blurring or sharpening, selection, and/or averaging pixel information from the source images. For example, changing the perspective of a field of view may be performed by warping or skewing the corresponding field of view. Moreover, identified objects at different distances may be skewed to different degrees corresponding to their distance. Similarly, objects that are in one source image but not the other (e.g., such as where only one of the cameras has a blind spot) will create a "ghost" or translucent version, if the redundant pixels are directly combined. In such cases, a more accurate rendering can be performed by selecting the pixels from one source image or the other. In still other cases, ghosting or translucency may be a desirable artifact. For example, objects in motion look more natural when rendered with slight ghosting, rather than with crisp lines (crisp edges create a stop-motion effect).

So-called "feature-based detection" can be used consistent with the present disclosure as well, and is based on edge detection, surface detection, object recognition, shape recognition, and/or any number of other visual recognition techniques. Additionally, artisans of ordinary skill in the related arts will readily appreciate that any feature matching between two different images, no matter how similar, will have ambiguous features or features which cannot be matched; consequently, most feature-based detection algorithms can only achieve a best fit based on for example, a sum of differences, sum of squares, or other such metric. Such metrics can also be reported as a confidence metric.

Application of feature recognition-based image stitching operations of the type that may be used within or by the recipient/target platform 304 would be well understood by artisans of ordinary skill given the present disclosure; see, e.g., additional details for feature based stitching operations as described within "*Image Alignment and Stitching: A Tutorial*," preliminary draft published Sep. 27, 2004 to Richard Szeliski, incorporated herein by reference in its entirety. Still other techniques and/or variations may be made by artisans of ordinary skill in the related arts, the foregoing being purely illustrative.

In contrast to the more complex approaches described above, one technique for quickly stitching together source images is a so-called "cut-and-feather" stitching technique. The first step of a cut-and-feather stitch is to cut (crop out) portions of a source image that extend beyond the stitch. For example, with the Janus configuration of FIG. 4A, the stitch is located at the 180° meridian. In some variants, the images may be cropped to favor one of the source images. For example, a first source image may have better image quality through 190° of view, therefore the counterpart second source image is cropped at a corresponding 170°. Moreover, since quality may vary over the image, it is further appreciated that different portions of a source image may be preferentially weighted. For example, a first source image may have a better or worse image quality in a certain subset of the overlap (and treated with a larger or smaller cropping area), whereas the remaining portions of the image are cropped at the default (e.g., 180°).

The resulting cropped images are joined and "feathered." Here, feathering generally refers to, without limitation: blending, filtering, blurring, sharpening, burning, and/or any number of other image processing techniques. More generally, feathering reduces or obfuscates the seam by averaging the differences in pixel values across the seam. Feathering is limited in effectiveness because it only considers the pixel information of the source images, and may introduce some undesirable artifacts into the resulting image (e.g., ghosting, translucency, etc.). However, feathering is computationally simple and can be performed with very little processing effort (and can be performed in varying degrees). Feathering is suitable for use on most mobile platforms, and/or where stitching must be done quickly (e.g., streaming video).

Cut operations and feather operations are well understood by artisans of ordinary skill; for example, additional details for cutout and feather type operations are described within "*Image Alignment and Stitching: A Tutorial*," preliminary draft published Sep. 27, 2004 to Richard Szeliski, previously incorporated herein by reference in its entirety. Still other techniques may be used and/or variations may be made by artisans of ordinary skill in the related arts when given the present disclosure, the foregoing being purely illustrative.

In some implementations, a cut-and-feather stitch may also provide some information as to the degree of confidence of the stitch. Simple metrics may include, without limitation: the differences in pixel information at the seam prior to feathering (e.g., a sum of difference, or sum of square of difference, or other metric), the amount of feathering (e.g., a sum of changes to pixel values), and/or other quantitative measures of smoothing. More complicated metrics may include e.g., user identified artifacts, holistic measures of the image (including portions outside of the stitch), and/or other identified metrics.

Further, in terms of the recipient/target platform 304 and its stitch processing logic 318 generally, various different stitching quality metrics may be gathered, again depending on the capabilities of the platform performing the stitching or combination. For instance, stitching metrics may be gathered and utilized by the stitch process 318 and may be based on the original quality of the source images; for example, a blurry or under exposed image provide considerably less information during stitching. Stitching metrics may also quantify the differences between the original source images at the stitch (e.g., the amount of disparity at the stitch, larger disparities result in poorer results). Under such measures, the difference in the stitch may be quantified in the amount of adjustment to pixel values; e.g., larger shifts in color values may indicate poor stitching. In other measures, the difference in the stitch may be quantified by the absolute number of pixels which changed (rather than a measure of pixel information). Additionally, changes to source images may be weighted differently. For example, a source image with dubious image quality (e.g., due to underexposure) may have an underweight effect on the resulting stitch.

Still other stitching metrics utilized by the post-processing stitch logic 318 may quantify holistic differences between the post-stitch image and its original source images. Stitching that has warping or skewing that appears to be multi-modal (with multiple maxima/minima) is unlikely to be attributable to mere differences in perspective and are more likely due to an unintentional "fold-in" stitch (where falsely matched distinct features of the source images were "folded" together into one feature). Similarly, excessive warping or skewing is also undesirable and may indicate problems with the originally captured source images. Some stitching metrics may attempt to quantify undesirable artifacts (e.g., blurriness, sharpness, unusual coloration). More generally, artisans of ordinary skill in the related arts will readily appreciate that virtually any "confidence" metric can be used to convey the quality of the stitched result.

It will also be appreciated that combination (e.g., stitch) quality may be localized to a spatial location within the stitched image. For example, consider an object that is occluded from one source image but present in the other. The remaining portions of the stitched image may be well stitched; however, the object itself will be difficult to reconcile into a final stitched image (e.g., whether the object is present or not).

Additionally, it will be recognized that heterogeneous or locally differentiated approaches can be used consistent with the present disclosure for combination of image data. For instance, stitching techniques may be localized to a spatial location within the stitched image; a mobile device for example (see discussion of FIG. 9) may be able to perform more complex stitching techniques (e.g., a depth-based stitch) over certain portions of interest within the image, but use simpler stitching techniques (e.g., a cut-and-feather stitch) over areas which are less important. Selective stitching can be useful to provide better results in reasonable processing times within the constraints of a mobile platform. For example, the user may be able to select portions of the quickly stitched image to check "on-the-spot"; the resulting localized high quality stitching will let the user know whether they "got the shot."

Various other techniques for full stitching or combination of images may be used consistent with the present disclosure, the foregoing being purely illustrative. Other techniques, such as the non-uniform downsampling approach described in co-owned and co-pending U.S. patent application Ser. No. 16/235,866 entitled "APPARATUS AND METHODS FOR NON-UNIFORM DOWNSAMPLING OF CAPTURED PANORAMIC IMAGES" filed Dec. 28, 2018 and incorporated herein by reference in its entirety, may be used consistent with the present disclosure as well.

Exemplary Capture Apparatus—

FIG. 4 is a block diagram illustrating components of an example capture apparatus able to read instructions from a computer-readable medium and execute them in one or more processors (or controllers). The apparatus in FIG. 4 may represent an implementation of, for example, the mobile action camera device 302 for performing the image capture, pre-processing, stabilization, and encoding processes described herein with respect to FIGS. 3 and 3A.

The capture apparatus 400 can be used to execute instructions (e.g., program code or software 416 stored in memory 414) for causing the capture apparatus 400 to perform any one or more of the methodologies (or processes) described herein. In some implementations, the capture apparatus 400 operates as a standalone mobile device, or as a connected (e.g., networked) device that connects to one or more networks or computer systems such as the computing device 700 of FIG. 7. The capture apparatus 400 may comprise, for example, a mobile "action" camera device such as a GoPro Fusion camera or other panoramic image capture device). In another embodiment, the capture apparatus 400 may be part of a host platform, such as a smartphone or laptop computer. Further, while only a single capture apparatus 400 is illustrated, a plurality of such devices may be used to source the image components described herein. For instance, in one variant, two spatially co-located (but otherwise unconnected or unaffiliated) devices pointed in different directions may be used to generate the unrefined image discussed elsewhere herein.

The example capture apparatus 400 includes multiple processing units, including (i) two (2) image signal processors 406 used to process the respective image data received from each sensor 110, 120, and a CPU processor apparatus 412 used to support operations of the capture device including execution of the aforementioned computer programs 416 relating to image data pre-processing, stabilization and encoding. Alternatively, a single image signal processor 406 may be used to process image data received from both sensors.

The processor apparatus of the capture apparatus 400 may further include, for example, one or more of a graphics processing unit (GPU), a digital signal processor (DSP), a controller, a state machine, one or more application specific integrated circuits (ASICs), as well as one or more radio-frequency integrated circuits (RFICs) (e.g., used to support wireless data communications via the data interface 418 such as via IEEE Std. 802.11, Bluetooth/BLE, IEEE Std. 802.15.4, 3GPP (e.g., 4G/4.5G/5G) NB-IoT, NFC (e.g., ISO 14433) or other air interface, or any combination of the foregoing. Similarly, the data interface(s) 418 may include wireline or optical interfaces such as USB, HDMI, DisplayPort, or other such interfaces and supporting protocols.

The capture apparatus 400 also includes a main memory 414, and may also include other storage devices (not shown) such as ROM, SRAM, as well as a mass storage device 422 such as NAND/NOR flash memory, SSD, or even a ruggedized HDD. The processor(s) 412, memory 414, the network interfaces 418, the storage units and the mass storage 422 may communicate via a bus using any number of data bus protocols such as PCIe.

In addition, the capture apparatus 400 may include a user interface 420 and supporting circuitry and software which may include a display device and driver (e.g., to drive a plasma display panel (PDP), a liquid crystal display (LCD), or capacitive touch screen). The capture apparatus 400 may also include input/output devices, e.g., an alphanumeric input device (e.g., touch screen-based keypad or an external input device such as a keyboard, which may be coincident with or part of the UI 420), a signal capture/generation device (e.g., a speaker and/or microphone; not shown).

FIG. 4A illustrates an embodiment of the capture device 302 of FIG. 4; i.e., as an exemplary spherical camera system that may include a first camera or sensor 110 capturing a first FOV 410 and a second camera or sensor 120 capturing a second FOV 408. In one or more implementations, the cameras 110, 120 may be integrated in a back-to-back configuration in which cameras 110, 120 face opposite directions. For example, in operation, the first camera 110 may be a "front-facing" camera 110 such that a user may point the first camera towards an object or scene of interest and the second camera 120 may be a "rear-facing" camera facing in an opposite direction of the front-facing camera 110. While the designations of front-facing and rear-facing are useful in describing the example processes described herein, these designations are arbitrary and the camera system 302 may operate in any orientation.

The fields of view 408, 410 may each include a hyper-hemispherical FOV that captures slightly greater than a 180° range in at least one direction. Because the respective fields of view 408, 410 are hyper-hemispherical (e.g., greater than 180°), they overlap in overlapping regions 402, 404 near their respective boundaries. For example, the fields of view 408, 410 may overlap by n degrees (e.g., where n equals 1°, 5°, 10° or other various degrees of field of view overlap between, for example, a front-facing and rear-facing camera). These overlapping regions 402, 404 may be used for the stitching or matching of separately captured images obtained by the respective cameras 110, 120, as will be described in further detail below. In implementations where the respective FOV ranges are equal for each of the first camera 110 and the second camera 120, these configurations will be referred to hereinafter as symmetric lensing configurations.

In some implementations, the first camera 110 may be configured to capture one range in at least one direction (e.g., 195°), while the second camera 120 may be configured to capture a different range in at least one direction (e.g., 225°). In other words, the first and second cameras 110, 120 may capture differing ranges in their respective fields of view 408, 410 so long as their fields of view overlap in at least one overlapping region 402, 404. In implementations where the respective FOV ranges differ for each of the first camera 110 and the second camera 120, these configurations will be referred to as asymmetric lensing configurations.

It will be appreciated that certain camera configurations contain three (or more) cameras; the corresponding field of views for these cameras don't necessarily have to be hyperhemispherical (i.e., greater than 180°). For example, in an implementation that utilizes three cameras, each of these cameras may capture an image that has a FOV that is greater than a 120° range in at least one direction, so that the resultant images may be stitched together into a full 360° field of view. Implementations that utilize three (or more) cameras may collectively contain either a symmetric lensing configuration or, alternatively, may collectively contain an asymmetric lensing configuration. Similarly, where a complete panorama is not required (e.g., less than a full 360° field of view), fewer cameras with reduced view angles can be used with equivalent success.

The number of pixels in a camera sensor and the FOV are typically "fixed" in a camera system and do not change during use. Generally, the manufacturer will design the camera to suit the intended application(s). For instance, an activity camera that is mobile and rugged will have different capture parameters than a cinema-quality camera designed for e.g., crane mounts or other bulky steadying platforms. Artisans of ordinary skill in the related arts will readily appreciate that the same number of pixels may be used to capture a larger FOV at lower resolution, or a smaller FOV at a higher resolution. For instance, a ten (10) Megapixel (MP) camera sensor that is coupled to a 195° FOV lens provides a higher effective resolution than the same 10 MP camera sensor used for a 245° FOV lens.

As shown in the configuration of FIG. 4A, the overlapping regions 402, 404 are fixed and do not change during use. Camera manufacturers may design the camera body with larger or smaller overlap regions; a larger overlap region may be used for better quality image stitching (as discussed above), but can result in an overall drop in image resolution as a result of a lower amount of pixels per degree of FOV (i.e., a lower number of pixels per degree of FOV). Conversely, a smaller overlap region may be used for lower quality image stitching, but may result in an overall increase in image resolution for the captured image.

In other designs, the overlapping regions may be configurable, due to changes in the camera body and/or lens. Video variants may even be able to dynamically change overlap regions during an ongoing capture. For example, video cameras may have optical lens elements that can physically change (even during ongoing capture) e.g., a zoom body that allows the camera to change the focal length. Similarly, static cameras are commonly designed with modular components that can be changed out; for example, different lens attachments can impart different view angles and/or focal lengths. Some cameras may even be constructed to allow different sensors or may selectively use different sensors with different capture characteristics (e.g., switching between optical and IR sensors, or between higher and lower capture quality sensors).

Figure 5A:
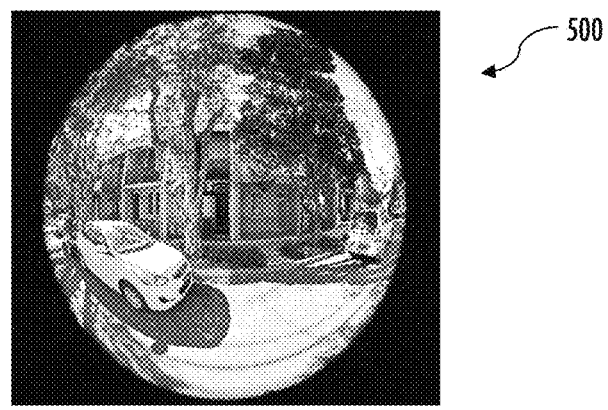
FIG. 5A is a pictorial representation of a fisheye projection of a captured scene, in accordance with the principles of the present disclosure.
Figure 5B:
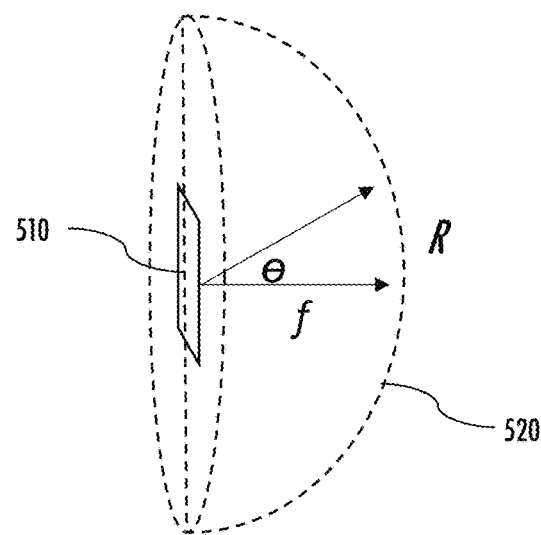
FIG. 5B is a graphical representation of a lens of an exemplary spherical camera system, in accordance with the principles of the present disclosure.
Figure 5C:
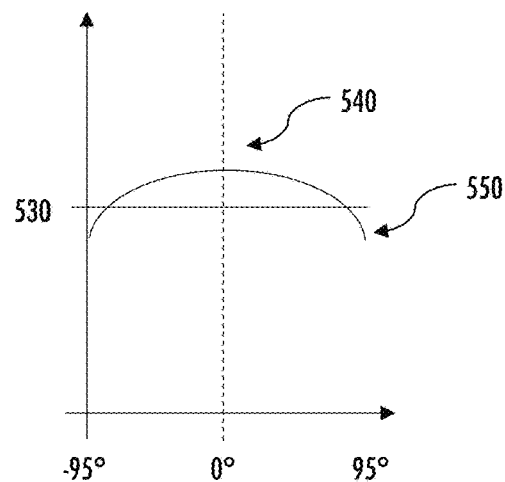
FIG. 5C is a plot of resolution density as a function of angle for the lens of FIG. 2B, in accordance with the principles of the present disclosure.

It will be appreciated that while the exemplary embodiments of the architecture 300 of FIGS. 3 and 3A are discussed in terms of spherical lenses with a prescribed projection and characteristics (such as those of FIG. 4A), other types of lenses/projections may be used as well. Spherical camera systems, such as the spherical camera system 302 shown in FIGS. 4 and 4A, capture images through the use of a fisheye lens. A fisheye lens is an ultra wide-angle lens that produces visual distortion, particularly towards the edges of a capture scene. FIG. 5A illustrates an exemplary captured scene 500 that illustrates the high levels of distortion towards the edges of the fisheye projection and lower levels of distortion towards the center focal point of the fisheye projection. FIG. 5B illustrates the cause of the distortion. In particular, the distortion is caused due to the geometry of the lens 520 as the lens focuses light onto an image sensor 510. Additionally, the geometry of the lens 520 also affects the resolution density of the captured image. For example as can be seen in FIG. 5B, light that enters the lens 520 in a manner that is orthogonal to the image sensor will have the highest amount of resolution. Conversely, light that enters the lens 520 at oblique angles to the image sensor will have lower amounts of resolution. FIG. 5C illustrates an exemplary resolution density as a function of viewing angle for a fisheye lens. As can be seen, the portion 540 of the captured scene at the center of the lens has the highest resolution density, while the portion 550 away from the center of the scene has a comparatively lower resolution density. The average resolution (or effective resolution) is illustrated by line 530. For example, a captured scene with an effective resolution of 4K will actually have a greater than 4K resolution at the center portion 540 of the captured scene, and a lower than 4K resolution at the outer portions 550 of the capture scene.

Figure 5D:
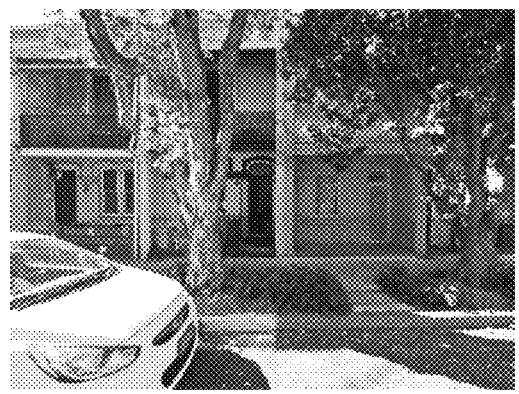
FIG. 5D is a pictorial representation of an ERP (equirectangular projection) of a captured scene, in accordance with the principles of the present disclosure.
Figure 5E:
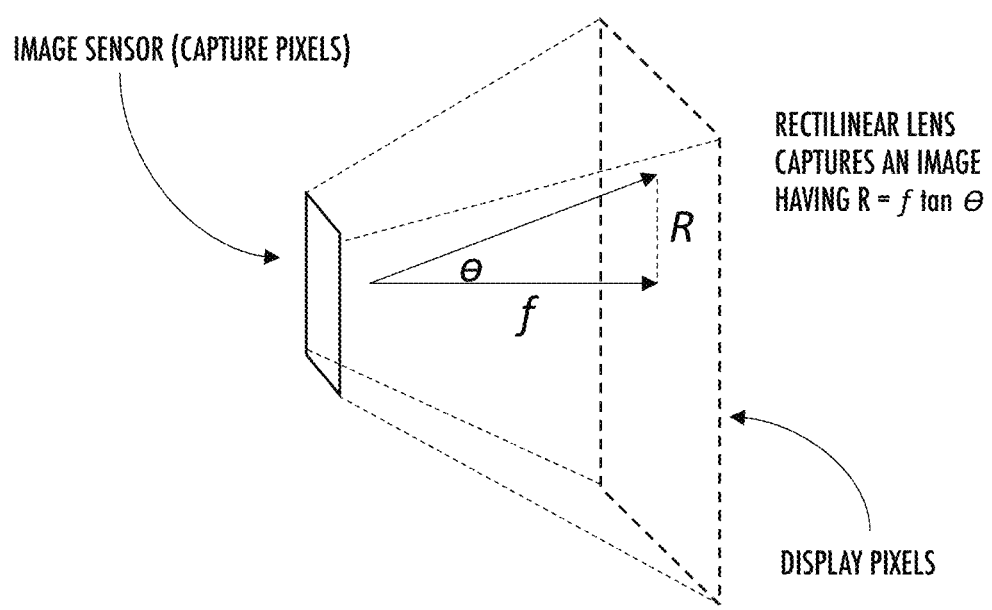
FIG. 5E is a graphical representation of a lens of an exemplary rectilinear camera system, in accordance with the principles of the present disclosure.

FIGS. 5D and 5E illustrate an exemplary rectilinear lens that may be used consistent with the methods and apparatus of the present disclosure. As with the fisheye lens of FIGS. 5A-5C, the rectilinear lens has an inherent variation in image resolution density as a function of the angle of the incident energy.

Figure 6:
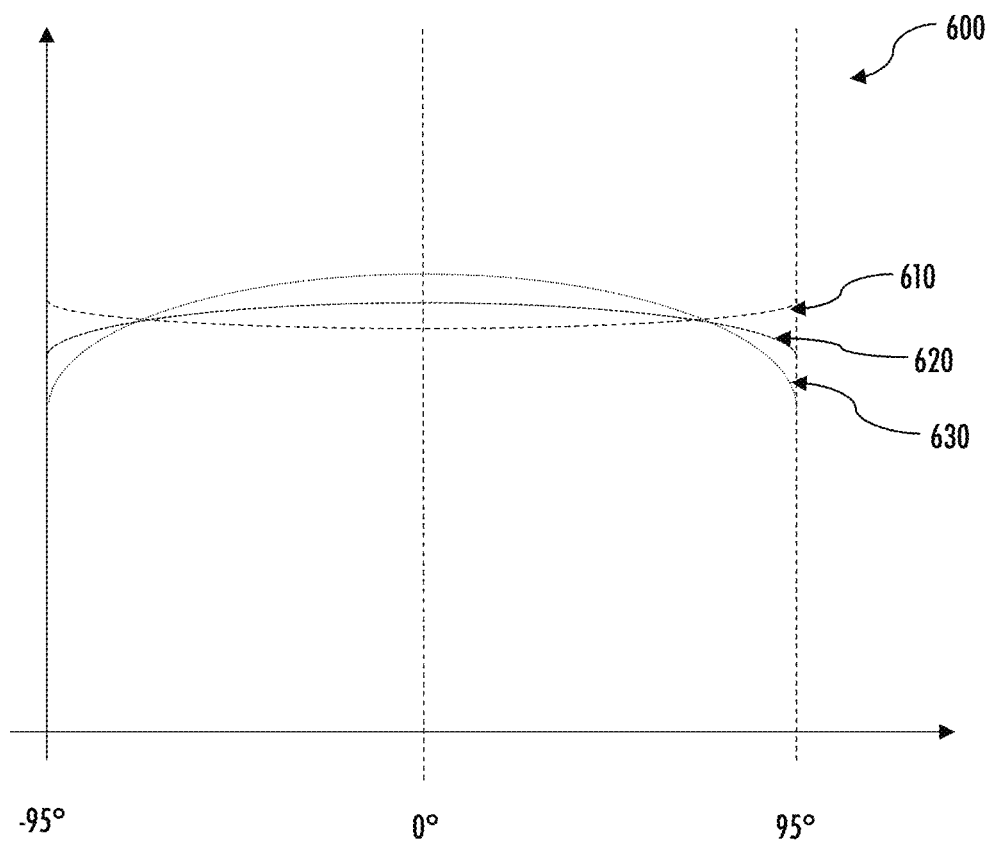
FIG. 6 is a plot of resolution density as a function of angle for a number of differing lenses, in accordance with the principles of the present disclosure.

As discussed above, the resolution density curve is a function of the lens geometry, as is shown in more detail in the plot 600 of FIG. 6. For example, an ideal fisheye lens may have a resolution density as a function of viewing angle that is represented by the first curve 630. Other lens geometry may have a "flatter" resolution density as represented by second curve 620. Yet other lens geometry may have an "inverted" resolution density as represented by the third curve 610. In the case of inverted resolution density curve 610, the resolution is effectively the highest towards the edges of the captured scene and lowest towards the center of the scene. Contrast this with curves 620, 630 where the resolution density is the lowest towards the edges of the captured scene. Notably, the various aspects of the present disclosure may advantageously be utilized with different types of resolution density profiles or curves. It should be further noted that the foregoing curves 610, 620, 630 are merely exemplary and that other lens geometries may collectively produce an effectively countless number of resolution density curves that may be used consistent with the disclosure.

Exemplary Recipient/Target Apparatus—

Figure 7:
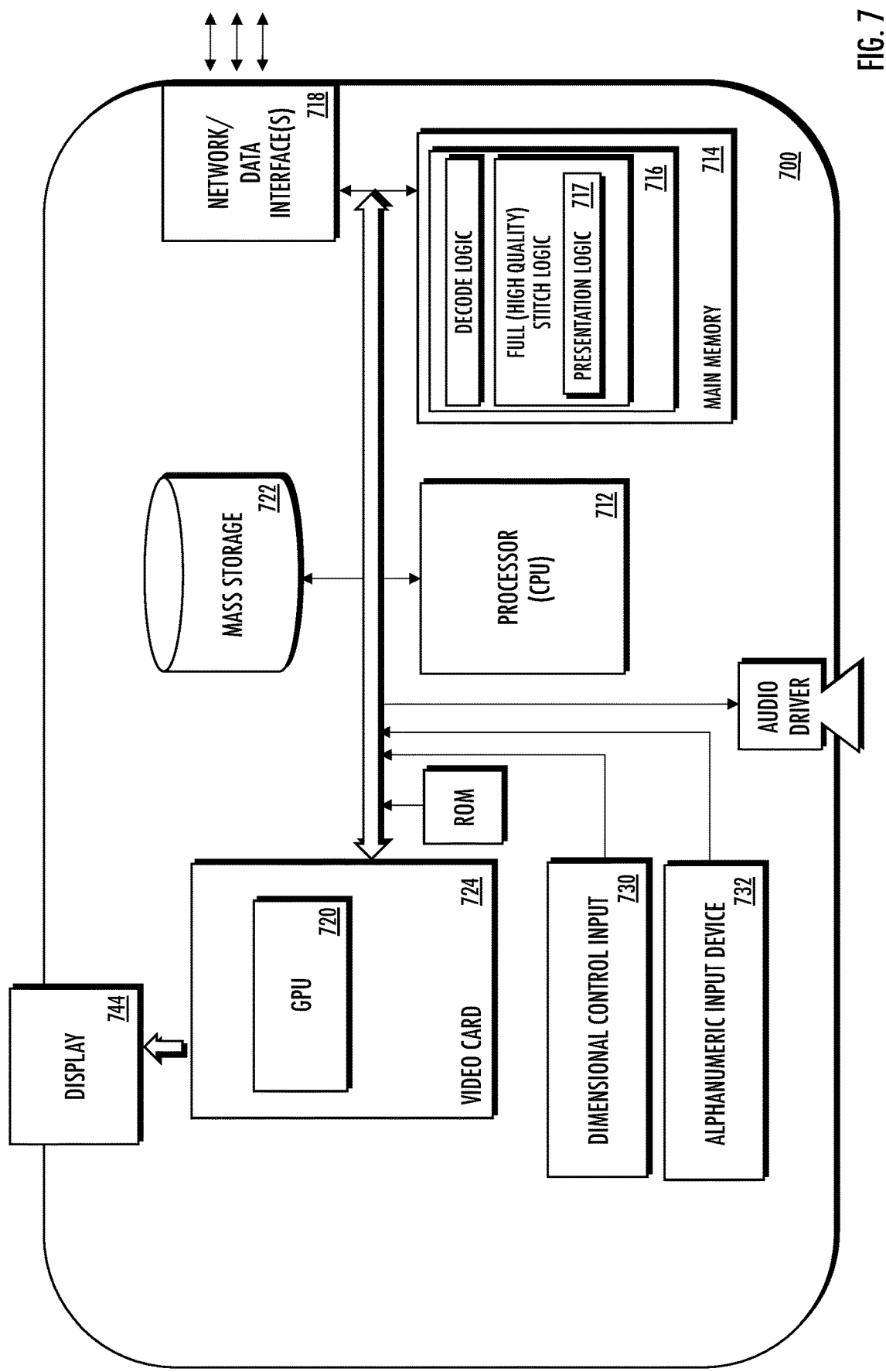
FIG. 7 is a block diagram of an exemplary implementation of a recipient device (e.g., computing device), useful in performing the methodologies described herein.

FIG. 7 is a block diagram illustrating components of an example recipient or target apparatus 304 useful with the various aspects of the present disclosure. In one variant, the recipient platform 304 is a high performance computing system able to read instructions from a computer-readable medium and execute them in one or more processors (or controllers). The computing system in FIG. 7 may represent an implementation of, for example, the video processing device for performing the decode and "full stitch" processes described herein.

The computing system 700 can be used to execute instructions 716 (e.g., program code or software) for causing the computing system 700 to perform any one or more of the methodologies (or processes) described herein. In some implementations, the computing system 700 operates as a standalone device or a connected (e.g., networked) device that connects to other computer systems (including the capture device 302 directly such as via wireless interface), or indirectly via an intermediary such as a cloud server or proxy process). The computing system 700 may include, for example, a personal computer (PC), a tablet PC, a notebook computer, or other device capable of executing instructions or logic (sequential or otherwise) that specify actions to be taken.

It will be noted that the computing system 700 may also be integrated with the capture device is some cases. For example, in some implementations the computing system 700 may include an image capture device (e.g., a GoPro Fusion camera or other panoramic image capture device) whether physically in its form factor or via cable.

In another embodiment, the computing system 700 may include a server. In a networked deployment, the computing system 700 may operate in the capacity of a server or client in a server-client network environment, or as a peer device in a peer-to-peer (or distributed) network environment. For instance, in one implementation, the computing system 700 may wirelessly interface with a plurality of different capture devices, whether homogeneous or heterogeneous in configuration (e.g., one spherical/fisheye, one single lens, etc.), such as for concurrent coverage of the same or different subject matter.

Further, while only a single computer system 700 is illustrated, a plurality of computing systems 700 may operate to jointly execute instructions 716 to perform any one or more of the methodologies discussed herein (e.g., via a distributed software environment). Such logic may include decode logic and full (high quality) stitch logic including presentation logic 717. As such, individual processing tasks associated with the logic 716 may be off-loaded or assigned to different devices.

The example computing system 700 includes one or more processing units (generally processor apparatus). The processor apparatus may include, for example, a central processing unit (CPU) 712, a graphics processing unit (GPU) 720 as part of a video card 724, and digital signal processor (DSP) (not shown). Such processors may also include a controller, a state machine, one or more application specific integrated circuits (ASICs), one or more radio-frequency integrated circuits (RFICs), or any combination of the foregoing. The computing system 700 also includes a main memory 714. The computing system 700 may include a storage unit. The CPU processor 712, memory 714 and mass storage unit 722 (as well as other components) may communicate via one or more data bus such as those compliant with PCIe or USB standards.

In addition, the computing system 700 may include a ROM, SRAM or other static memory, a display driver (e.g., to drive a display device 744 such as a plasma display panel (PDP), a liquid crystal display (LCD), capacitive or resistive touch screen input and display device as discussed below, or a projector). The computing system 700 may also include input/output devices, e.g., an alphanumeric input device 732 (e.g., touch screen-based keypad or an external input device such as a keyboard), a dimensional (e.g., 2-D or 3-D) control device 730 (e.g., a touch screen or external input device such as a mouse, a trackball, a joystick, a motion sensor, or other pointing instrument), a signal capture/generation device (e.g., a speaker, camera, and/or microphone), and one or more network interface devices 718 (including e.g., PAN, LAN, WLAN, and MAN interfaces such as BLE, 802.15.4, USB, Wi-Fi, 3GPP (4G/4.5G/5G)), the foregoing components which also are configured to communicate via the bus(es).

Embodiments of the computing system 700 corresponding to a client device may include a different configuration than an embodiment of the computing system 700 corresponding to a server. For example, an embodiment corresponding to a server may include larger storage capacity, more memory, and a faster processor/co-processors but may lack other components. An embodiment corresponding to a mobile device may include less mass storage, less memory, and a power efficient (and slower) processor core(s), and different wireless or network interfaces. Moreover, the logic 716 loaded onto the mobile device may be accordingly less capable than that of the high-end platform (e.g., PC) illustrated in FIG. 7.

In some embodiments, the instructions comprising the logic 716 may also reside, completely or at least partially, within the processor 712 (e.g., within a processor's cache or program memory) during execution thereof by the computing system 700, the main memory 714 and the processor 712 also constituting computer-readable media. The instructions of the logic 716 may be transmitted or received over a network via the network interface(s) 718 (e.g., at or before runtime).

While the computer-readable media memory 714, mass storage 722) are shown in an example embodiment to be single media, the term "computer-readable medium" should be taken to include a single medium or multiple media (e.g., a centralized or distributed database, or associated caches and servers) able to store the instructions 716 and/or other types of information. The term "computer-readable medium" shall also be taken to include any medium that is capable of storing instructions 716 for execution by the computing system 700 and that cause the computing system 700 to perform, for example, one or more of the methodologies disclosed herein.

In one exemplary implementation of the system 700, relative to extant systems, the jitter is removed and the compression image quality is higher. Moreover, metadata is utilized in the mode stabilization process. The "de-shaked" processing is not a final output, but rather merely a method to store an image efficiently using "consumer grade" compression. The user for example may want differing stabilization looks or parameters, based on for instance their particular output use cases. Hence, the stabilization process control may be based for example on metadata that describe one or more of (i) the original camera orientation, and (ii) the stored image orientation.

Exemplary Methods—

Figure 8:
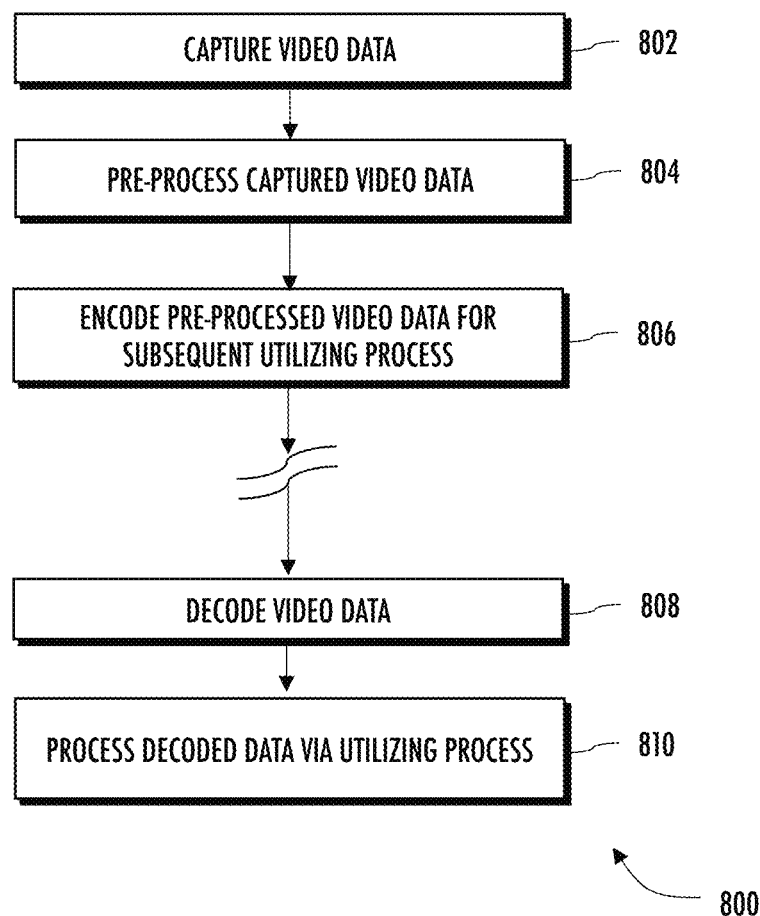
FIG. 8 is a logical flow diagram of one exemplary embodiment of a generalized method for processing captured video data, in accordance with the principles of the present disclosure.

Referring now to FIG. 8, one exemplary generalized methodology 800 for the processing of image data is shown and described in detail. It will be appreciated that the methodology of FIG. 8 may be applied to both multi-sensor image data (i.e., which requires some level of combination prior to subsequent processing), or single-sensor data.

At operation 802, image (video) data is captured by sensor(s) of the capture device and processed by associated ISP 406 process (FIG. 4).

Next, per operation 804, the captured video data is pre-processed by the capture device (e.g., by the CPU 412 and/or other dedicated processors/cores of the apparatus 302). In one embodiment, this pre-processing includes (i) combination of two or more sets of image data corresponding to the same temporal period, and (ii) subsequent stabilization of the combined data structure(s) generated by the combination process. For instance, in one variant, two contemporaneous frames of video data produced by the ISPs 406 are aligned or matched so as to permit stabilization. In another variant, two contemporaneous frames of video data produced by the ISPs 406 are "pre-stitched" (i.e., the unrefined image data combined at one or more edges with some loss of the constituent image data at those edges) so as to permit stabilization.

In one embodiment, the stabilization process includes application of one or more algorithms by the CPE 412 or other processing of the capture platform 302 to compensate for motion or movement such as described with respect to FIGS. 2A and 2B herein.

Next, per operation 806, the pre-processed (e.g., combined and stabilized) image data is then encoded to the target codec (e.g., MPEG) by the encoding logic/processes 314 of the capture device 302. As shown in FIGS. 3 and 3A, such encoding may include, inter alia, motion estimation, quantization, DCT, and residual encoding (as well as other processes), depending on the identity of the target codec.

Also, per step 806, any ancillary data or metadata is also included within the encoded video data as desired. For instance, timing data, capture device configuration, ID, MAC address, or other such information may be included.

Per operation 808, the recipient or target platform 304 receives the transmitted encoded (and appended as applicable) and decodes the encoded video data according to the target codec format (e.g., MPEG).

Lastly, per step 810, processing of the decoded video data according to the utilizing process is performed. In one embodiment, the utilizing process is one which is configured to perform additional processing steps on the decoded video data to further enhance its quality, FOV, stability, or achieve other desired results. As discussed with respect to subsequent variants (FIGS. 8A and 8B), such processing may include edge or feature detection, combination (e.g., stitching), filtering, color adjustment/enhancement, rotation, stabilization, and/or any number of other operations.

Referring now to FIG. 8A, one exemplary implementation 820 of the generalized methodology 800 for the processing of image data is shown and described in detail. It will be appreciated that the methodology of FIG. 8A may be applied to both multi-sensor image data (i.e., which requires some level of combination prior to subsequent processing), or single-sensor data.

At operation 822, image (video) data is captured by sensor(s) of the capture device and processed by associated ISP 406 process (FIG. 4). As previously discussed, in one variant, the image data is presented in an unrefined format, as generated by the sensor and associated ISP process 406 (FIG. 4) or the capture device 302.

Next, per operation 824, the captured video data is pre-processed by the capture device (e.g., by the CPU 412 and/or other dedicated processors/cores of the apparatus 302). In one embodiment, this pre-processing includes (i) combination of two or more sets of image data corresponding to the same temporal period, and (ii) subsequent stabilization of the combined data structure(s) generated by the combination process. For instance, in one variant, two contemporaneous frames of video data produced by the ISPs 406 are aligned or matched so as to permit stabilization. In another variant, two contemporaneous frames of video data produced by the ISPs 406 are "pre-stitched" (i.e., the unrefined image data combined at one or more edges with some loss of the constituent image data at those edges) so as to permit stabilization.

In one embodiment, the stabilization process of operation 824 includes application of one or more algorithms by the CPE 412 or other processing of the capture platform 302 to compensate for motion or movement such as described with respect to FIGS. 2A and 2B herein.

Next, per operation 826, the pre-processed (e.g., combined and stabilized) image data is then encoded to the target codec (e.g., MPEG) by the encoding logic/processes 314 of the capture device 302. As shown in FIGS. 3 and 3A, such encoding may include, inter alia, motion estimation, quantization, DCT, and residual encoding (as well as other processes), depending on the identity of the target codec. Per step 826, any ancillary data or metadata is also included within the encoded video data as desired, as previously described, as may associated audio track or other types of track data if not included in the encoding process.

Per operation 828, the encoded data is packaged by the lower layers of the capture device 302 protocol stack (e.g., addressed, framed, CRC applied, etc.) for transmission to the recipient/target platform 304. The transmission may occur immediately, after a period of time, be event drive (e.g., PUSH or PULL instigated by higher layer processes, etc.). It will be appreciated that while various embodiments of the disclosure contemplate generation of files (e.g., MPEG encoded files) that are transmitted, the disclosure also contemplates real time or streaming protocols for delivery of the encoded media data as well.

Per operation 830, the recipient or target platform 304 receives the transmitted encoded (and appended as applicable).

Per operation 832, the received data is unpacked (e.g., framing/headers stripped as applicable, packets re-sequenced for streaming media, error correction applied, etc.).

Per operation 834, the stripped (encoded) media data is decoded according to the target codec format (e.g., MPEG).

Lastly, per step 836, processing of the decoded video data according to the utilizing process is performed; here, a "full stitch" of the type described above among other operations. As noted above, the utilizing process is one which is configured to perform additional processing steps on the decoded video data to further enhance its quality, FOV, stability, or achieve other desired results. Such processing may include edge or feature detection, high-quality combination (e.g., stitching), filtering, color adjustment/enhancement, rotation, stabilization, and/or any number of other operations. Advantageously, by virtue of the "pre-stitch" and stabilization by the encoding platform 302, the undesired artifacts such as non-physical object motion or jitter are absent from the decoded and full-processed image data, thereby enhancing user experience.

Figure 8B:
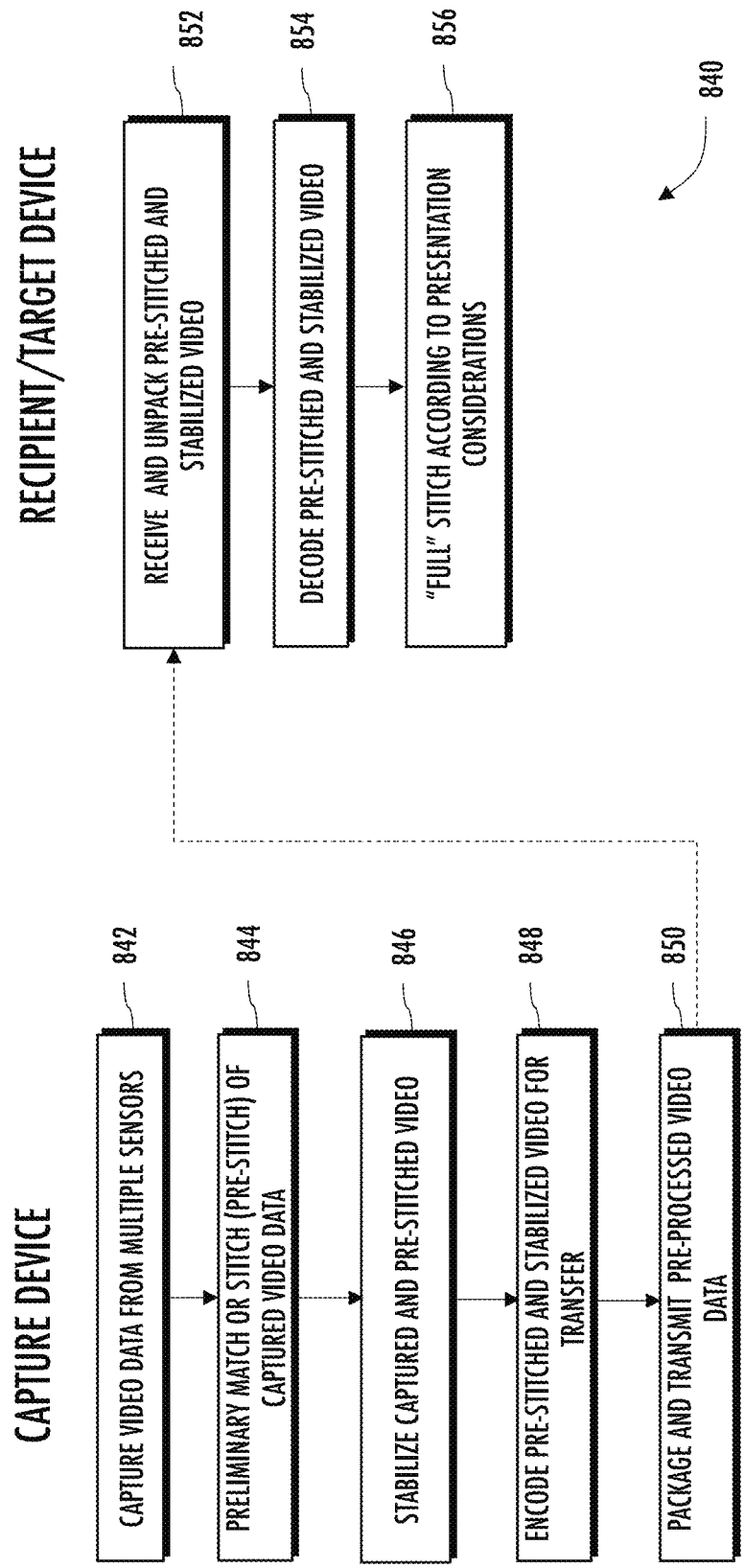
FIG. 8B is a logical flow diagram of another exemplary implementation of the generalized method for processing captured video data of FIG. 8.

Referring now to FIG. 8B, another exemplary implementation 840 of the generalized methodology 800 for the processing of image data is shown and described in detail.

At operation 842, image (video) data is captured by the capture device. As previously discussed, in one variant, the image data is presented in an unrefined format, as generated by the sensors and associated ISP processes 406 (FIG. 4) or the capture device 302. In this example, two (2) sensors of the spherical or fisheye type are described for purposes of illustration.

Next, per operation 844, the captured video data is preliminarily matched or aligned by the capture device (e.g., by the CPU 412 and/or other dedicated processors/cores of the apparatus 302). In one embodiment, this pre-processing includes (i) combination of the two sets of image data corresponding to the same temporal period from the two sensors/ISPs of the capture device, and (ii) subsequent stabilization of the combined data structure(s) generated by the combination process. For instance, in one variant, two contemporaneous frames of video data produced by the ISPs 406 are aligned or matched so as to permit stabilization, without any stitching per se (i.e., no interleaving, replacement, deletion of overlap, etc.). In another variant, two contemporaneous frames of video data produced by the ISPs 406 are "pre-stitched" (i.e., the unrefined image data combined at one or more edges with some loss of the constituent image data at those edges due to elimination of overlap data, redundant pixel replacement, etc.) so as to permit stabilization.

Next, per operation 846, the combined image is stabilized. In one embodiment, the stabilization process of operation 846 includes application of one or more algorithms by the CPE 412 or other processing of the capture platform 302 to compensate for motion or movement such as described with respect to FIGS. 2A and 2B herein. Notably, without the combination per operation 844, the subsequent stabilization may ultimately yield an improper result (i.e., two non-aligned or rotated images, if stabilized by the capture device stabilization logic, may ultimately be encoded and decoded with that misalignment/rotation, and hence produce a non-physical result upon final processing).

Next, per operation 848, the pre-processed (e.g., combined and stabilized) image data is then encoded to the target codec (e.g., MPEG) by the encoding logic/processes 314 of the capture device 302. As shown in FIGS. 3 and 3A, such encoding may include, inter alia, motion estimation, quantization, DCT, and residual encoding (as well as other processes), depending on the identity of the target codec. Per operation 848, any ancillary data or metadata is also included within the encoded video data as desired, as previously described, as may associated audio track or other types of track data if not included in the encoding process.

Per operation 850, the encoded data is packaged by the lower layers of the capture device 302 protocol stack (e.g., addressed, framed, CRC applied, etc.) for transmission to the recipient/target platform 304. The transmission may occur immediately, after a period of time, or be event driven (e.g., PUSH or PULL instigated by higher layer processes, etc.). It will be appreciated that while various embodiments of the disclosure contemplate generation of files (e.g., MPEG encoded files) that are transmitted, the disclosure also contemplates real time or streaming protocols for delivery of the encoded media data as well.

Per operation 852, the recipient or target platform 304 receives the transmitted encoded (and appended as applicable), and unpacks the transmitted media data (e.g., file, or packets as applicable); e.g., framing/headers stripped as applicable, packets resequenced for streaming media, error correction applied, etc.

Per operation 854, the stripped (encoded) media data is decoded according to the target codec format (e.g., MPEG).

Lastly, per step 856, a "full stitch" of the type described above among other operations is performed. As noted above, the utilizing process is one which is configured to perform additional processing steps on the decoded image data to further enhance its quality, FOV, stability, or achieve other desired results. Such processing may include edge or feature detection, high-quality combination (e.g., stitching), filtering, color adjustment/enhancement, rotation, stabilization, and/or any number of other operations. Advantageously, by virtue of the "pre-stitch" and stabilization by the encoding platform 302, the undesired artifacts such as non-physical object motion or jitter are absent from the decoded and full-processed image data, thereby enhancing user experience.

FIG. 9 illustrates exemplary use cases for the various configurations of the architecture and methods of the present disclosure. In the first scenario 902 (top of FIG. 9), the capture device 302 communicates the "pre-processed" (e.g., unrefined combined and stabilized and then encoded) video data to a mobile device 910 such as a user's smartphone, via a wireless interface of the type previously described. In this scenario, the mobile device 910 (having comparatively lower processing capability, storage, etc. as compared to a full-quality image editing or development platform 920 (bottom), includes computer logic (e.g., software) configured to develop a lower-quality combination or stitched image 912 from the received encoded data. For instance, some of the full-function or complex combinational operations described above such as edge detection, metric assessment, depth analysis, etc. may not be supported on the mobile device software, and hence such are substituted with more rudimentary processes such as cut-and-feather, etc. so as to enable the viewing user to briefly view and cognate the captured and processed images data from a higher layer of abstraction (i.e., Did I get it? Was it pointing at the correct object?). Advantageously, such reduced processing all carries the attendant benefits of reduced processing (and heat generation) and reduced power consumption.

In contrast, in the second scenario 904 (bottom of FIG. 9), the capture device 302 communicates the "pre-processed" (e.g., unrefined combined and stabilized and then encoded) video data to a full function computing device 920 such as a user's PC, laptop, or even a cloud processing entity, via a wireless interface of the type previously described. In this scenario, the full-function device 920 (having comparatively higher processing capability, storage, etc. as compared to a mobile platform 910 (top), includes computer logic (e.g., software) configured to develop a high-quality combination or stitched image 912 from the received encoded data. For instance, some of the full-function or complex combinational operations described above such as edge detection, metric assessment, depth analysis, etc. which were not supported on the mobile device software are included in the software suite resident on the full-capacity device 920, and hence high-quality combination/stitching operations, as well as others, are used to produce the best possible quality "final" video data.

In either scenario 902, 904, the same "front end" processing on the capture device can be used, since in the exemplary embodiments, no meaningful degradation of the unrefined image data occurs as part of the pre-processing logic thereof. In the exemplary implementations, the original captured data is sourced from the capture device to maximize quality; the mobile device 910 in the first scenario 902 is just de-tuned as it were in terms of its capability to fully exploit the data. As such, data transfers 930 between the two devices (if used) should be configured so as to take into account the relative processing capabilities of the different devices. For instance, a transfer of "full-processed" data from the mobile device 910 to the full-capability device 920 will not enable the full-quality device 920 (absent any direct sourcing of the encoded data from the camera) to recover or reconstitute the high quality of the encoded image data; once the mobile device has processed it, the best the high-quality device can make from that is the same quality as the mobile device image 912. Note, however, that if the identical sourced data (i.e., the encoded file or stream received from the capture device 302) is merely provided over to the full-quality platform 920 before subsequent processing, then a full-quality image can likewise be obtained.

Conversely, the mobile device 910 may be equipped to render the high-quality image data generated by the full-quality platform 920 with no loss of quality relative to the high-quality stitched image 922.

Where certain elements of these implementations can be partially or fully implemented using known components, only those portions of such known components that are necessary for an understanding of the present disclosure are described, and detailed descriptions of other portions of such known components are omitted so as not to obscure the disclosure.

The processes described herein may be performed by a video processing system including at least one processor and a non-transitory computer-readable storage apparatus having a storage medium. The storage medium stores a number of computer-executable instructions thereon, that when executed by the at least one processor, cause the at least one processor to perform the processes described herein. In an embodiment, the video processing system may be partially or wholly implemented in the camera 302 or may be implemented partially or wholly in an external device (e.g., in a computing device 304 or mobile device 910), that is separate from the camera system 302 that obtained the images). The various methodologies described herein are useful in, for example, the compression, storage and/or transmission of this captured video data. The various methodologies described herein may also be useful in stitching processes associated with captured panoramic images.

Additionally, the processes and methodologies described herein (or portions thereof) may be performed by dedicated computerized system logic, including without limitation, application-specific integrated circuits (ASICs), field-programmable gate arrays (FPGAs), and/or other types of integrated circuits or dedicated computerized logic that may be utilized in addition to, or alternatively from, the aforementioned computer-readable storage apparatus.

Moreover, in the present specification, an implementation showing a singular component should not be considered limiting; rather, the disclosure is intended to encompass other implementations including a plurality of the same component, and vice-versa, unless explicitly stated otherwise herein.

Further, the present disclosure encompasses present and future known equivalents to the components referred to herein by way of illustration.

As used herein, the term "computing device", includes, but is not limited to, personal computers (PCs) and mini-computers, whether desktop, laptop, or otherwise, mainframe computers, workstations, servers, personal digital assistants (PDAs), handheld computers, embedded computers, programmable logic device, personal communicators, tablet computers, portable navigation aids, J2ME equipped devices, cellular telephones, smart phones, personal integrated communication or entertainment devices, or literally any other device capable of executing a set of instructions.

As used herein, the term "computer program" or "software" is meant to include any sequence or human or machine cognizable steps which perform a function. Such program may be rendered in virtually any programming language or environment including, for example, C/C++, C #, Fortran, COBOL, MATLAB™, PASCAL, Python, assembly language, markup languages (e.g., HTML, SGML, XML, VoXML), and the like, as well as object-oriented environments such as the Common Object Request Broker Architecture (CORBA), Java™ (including J2ME, Java Beans), Binary Runtime Environment (e.g., BREW), and the like.

As used herein, the terms "integrated circuit", is meant to refer to an electronic circuit manufactured by the patterned diffusion of trace elements into the surface of a thin substrate of semiconductor material. By way of non-limiting example, integrated circuits may include field programmable gate arrays (e.g., FPGAs), a programmable logic device (PLD), reconfigurable computer fabrics (RCFs), systems on a chip (SoC), application-specific integrated circuits (ASICs), and/or other types of integrated circuits.

As used herein, the term "memory" includes any type of integrated circuit or other storage device adapted for storing digital data including, without limitation, ROM. PROM, EEPROM, DRAM, Mobile DRAM, SDRAM, DDR/2 SDRAM, EDO/FPMS, RLDRAM, SRAM, "flash" memory (e.g., NAND/NOR), memristor memory, and PSRAM.

As used herein, the term "processing unit" is meant generally to include digital processing devices. By way of non-limiting example, digital processing devices may include one or more of digital signal processors (DSPs), reduced instruction set computers (RISC), general-purpose (CISC) processors, microprocessors, gate arrays (e.g., field programmable gate arrays (FPGAs)), PLDs, reconfigurable computer fabrics (RCFs), array processors, secure microprocessors, application-specific integrated circuits (ASICs), and/or other digital processing devices. Such digital processors may be contained on a single unitary IC die, or distributed across multiple components.

As used herein, the term "camera" may be used to refer without limitation to any imaging device or sensor configured to capture, record, and/or convey still and/or video imagery, which may be sensitive to visible parts of the electromagnetic spectrum and/or invisible parts of the electromagnetic spectrum (e.g., infrared, ultraviolet), and/or other energy (e.g., pressure waves), and may include one or more discrete camera or sensor elements.

It will be recognized that while certain aspects of the technology are described in terms of a specific sequence of steps of a method, these descriptions are only illustrative of the broader methods of the disclosure, and may be modified as required by the particular application. Certain steps may be rendered unnecessary or optional under certain circumstances. Additionally, certain steps or functionality may be added to the disclosed implementations, or the order of performance of two or more steps permuted. All such variations are considered to be encompassed within the disclosure disclosed and claimed herein.

While the above detailed description has shown, described, and pointed out novel features of the disclosure as applied to various implementations, it will be understood that various omissions, substitutions, and changes in the form and details of the device or process illustrated may be made by those skilled in the art without departing from the disclosure. The foregoing description is of the best mode presently contemplated of carrying out the principles of the disclosure. This description is in no way meant to be limiting, but rather should be taken as illustrative of the general principles of the technology. The scope of the disclosure should be determined with reference to the claims.

What is claimed is:

1. A method of encoding captured image data comprising:
  receiving at least two captured image data corresponding to a same temporal period;

stitching the at least two captured image data to create stitched image data;

performing image stabilization on the stitched image data to create stabilized image data; and encoding a plurality of the stabilized image data to generate stabilized video data comprising post-image stabilization motion estimation vectors.

2. The method of claim 1, wherein the image stabilization creates metadata that describes one or more of an original camera orientation and a stored image orientation.

3. The method of claim 1, wherein the at least two captured image data comprises image data in an unrefined image format and the stabilized video data comprises video data in a lossy motion-estimation-based codec format.

4. The method of claim 1, wherein the image stabilization reduces jitter in the stitched image data.

5. The method of claim 1, wherein encoding the plurality of the stabilized image data comprises performing motion estimation.

6. The method of claim 5, wherein performing motion estimation comprises one or more of:

performing motion estimation between a previously reconstructed frame and a current frame, performing current frame prediction using motion estimates and the previously reconstructed frame, and performing differential encoding of the current frame prediction and an actual current frame as prediction error.

7. The method of claim 1, further comprising transferring the stabilized video data to another device.

8. The method of claim 7, further comprising:

decoding the stabilized video data on the another device to create decoded video data;

processing the decoded video data on the another device to create processed video data; and re-encoding the processed video data on the another device.

9. The method of claim 1, wherein the stabilized video data is generated for transmission to another device for additional processing to create a full-processed image absent non-physical object motion.

10. The method of claim 1, wherein encoding the plurality of the stabilized image data comprises performing motion estimation between a previously reconstructed frame and a current frame using the stabilized image data to generate the post-image stabilization motion estimation vectors.

11. An apparatus for image processing, comprising:

a first image sensor;

a second image sensor;

a processor; and a non-transitory computer-readable medium comprising one or more instructions which, when executed by the processor causes the apparatus to:

receive first captured image data from the first image sensor and second captured image data from the second image sensor, the first captured image data and the second captured image data corresponding to a same temporal period;

combine the first captured image data and the second captured image data to create combined image data;

perform image stabilization on the combined image data to create stabilized image data; and encode a plurality of the stabilized image data to generate stabilized video data comprising post-image stabilization motion estimation vectors.

12. The apparatus for image processing of claim 11, wherein the combined image data has a 360° field of view.

13. The apparatus for image processing of claim 11, wherein the encoding of the plurality of the stabilized image data comprises a lossy encoding.

14. The apparatus for image processing of claim 11, further comprising a data interface, wherein the instructions which, when executed by the processor further causes the apparatus to transmit the stabilized video data as a plurality of streaming packets over the data interface.

15. The apparatus for image processing of claim 11, wherein the encoding the plurality of stabilized image data comprises performing a simplified motion estimation based on eliminating one or more motion-related artifacts.

16. A non-transitory computer-readable apparatus comprising a storage medium having a computer program stored thereon, the computer program comprising a plurality of instructions configured to, when executed by a processor, cause an apparatus to:

receive captured video data;

remove jitter from the captured video data to create stabilized video; and encode the captured video data to create an encoded video data, the encoding comprising performing a motion estimation based on the stabilized video to generate post-image stabilization motion estimation vectors.

17. The non-transitory computer-readable apparatus of claim 16, wherein removing jitter from the captured video comprises performing image stabilization on the captured video data.

18. The non-transitory computer-readable apparatus of claim 16, wherein the removal of jitter from the captured video data reduces complexity of the motion estimation.

19. The non-transitory computer-readable apparatus of claim 18, wherein reduced complexity of the motion estimation reduces a file size of the encoded video data.

20. The non-transitory computer-readable apparatus of claim 16, wherein:

the captured video data comprises a first video data and a second video data, and the plurality of instructions configured to, when executed by the processor, cause the apparatus to combine of the first video data and the second video data by matching of at least one feature along at least one common contextual edge of the first video data and the second video data.

* * * * *